(12) United States Patent
Junk et al.

(10) Patent No.: US 9,982,209 B2
(45) Date of Patent: May 29, 2018

(54) LOW-WEAR FLUOROPOLYMER COMPOSITES

(71) Applicant: The University of Florida Research Foundation, Inc., Gainesville, FL (US)

(72) Inventors: Christopher P. Junk, Wilmington, DE (US); Gregory Scott Blackman, Media, PA (US); Steven R. Lustig, Landenberg, PA (US); Mark D. Wetzel, Newark, DE (US); Wallace Gregory Sawyer, Gainesville, FL (US); Brandon A. Krick, Gainesville, FL (US)

(73) Assignee: UNIVERSITY OF FLORIDA RESEARCH FOUNDATION, INC, Gainesville, FL (US)

( * ) Notice: Subject to any disclaimer, the term of this patent is extended or adjusted under 35 U.S.C. 154(b) by 979 days.

(21) Appl. No.: 14/136,672

(22) Filed: Dec. 20, 2013

(65) Prior Publication Data

US 2014/0106162 A1  Apr. 17, 2014
US 2015/0050488 A2  Feb. 19, 2015

Related U.S. Application Data

(63) Continuation-in-part of application No. 14/116,917, filed as application No. PCT/US2012/037850 on May (Continued)

(51) Int. Cl.
*C10M 125/10* (2006.01)
*B82Y 30/00* (2011.01)
(Continued)

(52) U.S. Cl.
CPC .......... *C10M 125/10* (2013.01); *B82Y 30/00* (2013.01); *C04B 26/08* (2013.01); *C04B 35/117* (2013.01);
(Continued)

(58) Field of Classification Search
CPC .............. C10M 125/10; C10M 107/38; C10M 2201/062; C10M 2201/105;
(Continued)

(56) References Cited

U.S. PATENT DOCUMENTS 5,427,698 A  6/1995 Hirokawa et al.
6,153,303 A  11/2000 Namura et al.
(Continued)

FOREIGN PATENT DOCUMENTS

JP      2004149622 A    1/1900
WO   WO 2006128128 A2 *  11/2006 ............. B82Y 30/00

OTHER PUBLICATIONS

Alexander et al., "Determination of Particle Sizes in Colloidal Silica", J. Phys. Chem. vol. 57(9), (1953), pp. 932-934.*
(Continued)

*Primary Examiner* — Ling Siu Choi
*Assistant Examiner* — Ronald Grinsted
(74) *Attorney, Agent, or Firm* — Thomas Horstemeyer, LLP

(57) ABSTRACT

A low-wear fluoropolymer composite body comprises at least one fluoropolymer and additive particles dispersed therein. Also provided is a process for the fabrication of such a fluoropolymer composite body. The composite body exhibits a low wear rate for sliding motion against a hard counterface, and may be formulated with either melt-processible or non-melt-processible fluoropolymers.

31 Claims, 6 Drawing Sheets

Related U.S. Application Data 14, 2012, said application No. 14/136,672 is a continuation-in-part of application No. 13/739,038, filed on Jan. 11, 2013, now Pat. No. 8,728,993.

(51) Int. Cl.
| | | |
|---|---|---|
| *C04B 26/08* | (2006.01) | |
| *C04B 35/117* | (2006.01) | |
| *C08K 3/22* | (2006.01) | |
| *C10M 107/38* | (2006.01) | |
| *F16C 33/20* | (2006.01) | |
| *C04B 111/00* | (2006.01) | |

(52) U.S. Cl.
CPC ............. *C08K 3/22* (2013.01); *C10M 107/38* (2013.01); *F16C 33/201* (2013.01); *C04B 2111/00008* (2013.01); *C04B 2111/00362* (2013.01); *C04B 2235/3217* (2013.01); *C04B 2235/444* (2013.01); *C04B 2235/5454* (2013.01); *C08K 2003/2227* (2013.01); *C08K 2201/005* (2013.01); *C10M 2201/062* (2013.01); *C10M 2201/105* (2013.01); *C10M 2213/043* (2013.01); *C10M 2213/0623* (2013.01); *C10N 2220/082* (2013.01); *C10N 2230/06* (2013.01); *C10N 2240/02* (2013.01); *C10N 2250/08* (2013.01); *Y10T 428/25* (2015.01); *Y10T 428/256* (2015.01); *Y10T 428/257* (2015.01)

(58) Field of Classification Search
CPC .... C10M 2213/043; C10M 2213/0623; B82Y 30/00; C04B 26/08; C04B 35/117; C04B 2111/00008; C04B 2111/00362; C04B 2235/3217; C04B 2235/444; C08K 3/22; C08K 2003/2227; C08K 2201/005; F16C 33/201; Y10T 428/25; Y10T 428/256; Y10T 428/257; C10N 2220/082; C10N 2230/06; C10N 2240/02; C10N 2250/08
USPC ...................................................... 428/421
See application file for complete search history.

(56) References Cited

U.S. PATENT DOCUMENTS

| | | |
|---|---|---|
| 6,225,399 B1 | 5/2001 | Araki et al. |
| 6,228,904 B1 | 5/2001 | Yadav et al. |
| 6,461,679 B1 | 10/2002 | McMeekin et al. |
| 6,667,360 B1 | 12/2003 | Ng et al. |
| 7,094,361 B2 | 8/2006 | Riman et al. |
| 7,265,174 B2 | 9/2007 | Carroll et al. |
| 7,265,176 B2 | 9/2007 | Troeltzsch et al. |
| 7,276,231 B2 | 10/2007 | Frerichs et al. |
| 7,485,282 B2 | 2/2009 | Pinnavaia et al. |
| 7,495,049 B2 | 2/2009 | Lee |
| 7,745,513 B2 | 6/2010 | Abuselme et al. |
| 7,888,419 B2 | 2/2011 | Cooper et al. |
| 2002/0168569 A1* | 11/2002 | Barriere ............... H01M 2/164 429/217 |
| 2005/0143508 A1 | 6/2005 | Tyagi et al. |
| 2005/0267246 A1* | 12/2005 | McKeen ................. C08J 5/18 524/450 |
| 2010/0080959 A1* | 4/2010 | Harvey ................. C08L 27/18 428/172 |
| 2010/0261809 A1 | 10/2010 | Nam et al. |

OTHER PUBLICATIONS

Fluoroelastomers (FKM), http://iisrp.com/WebPolymers/AboutRubber/06Fluoroelastomers16Aug2012.pdf—Online: Aug. 16, 2012.*
Pianca et al., "End groups in fluoropolymers", J. Fluorine Chemistry vol. 95 (1999) pp. 71-84.*
Strem Chemical—Aluminum Oxide (www.azom.com/article.aspx?ArticleID=4616—written Mar. 14, 2009).*
Chunxia, et al., Mechanical Property of PTFE Composites Filled with Different Nano=Particles; Engineering Plastics Applications; vol. 28, No. 12, 2000.
Chunxia, et al., Friction and Wear Properties of nanocrystalline-A12o3-Filled PTFE Composites; Tribology; vol. 20, No.; Apr. 2000.

* cited by examiner

LOW-WEAR FLUOROPOLYMER COMPOSITES

CROSS-REFERENCE TO RELATED APPLICATIONS

This application is a continuation in part of and claims priority to U.S. patent application Ser. No. 14/116,917 filed Nov. 1, 2013, which claims benefit under 35 USC § 371 to PCT/US Application Ser. No. PCT/US2012/037850, filed May 14, 2012, which claims priority to Provisional Patent Application No. 61/486,068, filed May 13, 2011.

This application is a continuation in part of and claims priority to U.S. patent application Ser. No. 13/739,038, filed Jan. 11, 2013, now issued as U.S. Pat. No. 8,728,993. U.S. patent application Ser. No. 13/739,038 is a continuation application of U.S. patent application Ser. No. 12/861,985, filed Aug. 24, 2010, now issued as U.S. Pat. No. 8,383,561; which is a continuation application of U.S. patent application Ser. No. 11/443,384, filed May 30, 2006, now issued as U.S. Pat. No. 7,790,658; which claims priority to Provisional Patent Application No. 61/486,068, filed May 27, 2005.

FEDERAL SPONSORSHIP

This invention was made with Government support under Contract/Grant No. FA9550-04-1-0367 awarded by the AFOSR MURI and Grant No. CMS-0219889 awarded by the NSF. The Government has certain rights in this invention.

TECHNICAL FIELD

This subject matter hereof relates to composite materials and, more particularly, to a composition of matter, a low-wear fluoropolymer composite body formed therewith, and a method for producing the composite body. The composition comprises a fluoropolymer matrix and particulate filler material dispersed therein.

BACKGROUND

The low-friction properties of many fluoropolymers have long been known and have led to application of these materials as one or both of the facing surfaces of a low-friction couple. Fluoropolymers are attractive for a variety of applications because they are relatively inert against a wide variety of chemical substances, have high melting points, and are generally biocompatible. Fluoropolymers, often in the form of finely divided powders that may be dispersed in liquid or solid carriers, also have been used as lubricants for other bearing surfaces.

However, known fluoropolymers used as lubricants and bearing surfaces generally have been found to exhibit very poor wear rate, which often mitigates the benefit of their low friction characteristics and other desirable physical and chemical properties. For example, an operating mechanism that includes a bearing surface made of a material having low wear rate may have to be given frequent maintenance, often involving down-time and replacement of parts, to prevent actual failure and potentially catastrophic consequences. Production efficiency and machine utilization may be adversely affected. In some cases, the critical nature of some function precludes use of a fluoropolymer bearing surface that might fail in favor of a more expensive approach that may involve other detriments.

In the case of a friction couple of the widely-used polymer polytetrafluoroethylene (PTFE) and a hard surface such as a metal, it is found that the PTFE acts as a transfer lubricant. Relative mechanical motion between the PTFE and the facing hard surface causes a transfer layer, also termed a transfer film, of PTFE to be continually built up on the hard surface, so that the immediate bearing contact effectively is between PTFE on both surfaces. However, as soon as the transfer layer reaches a modest thickness, flake-like portions of the transfer surface typically begin to break off as wear debris. As mechanical motion continues, additional material is transferred from the bulk PFTE member, only to be shed as additional wear debris, signaling poor durability of the PTFE bearing material.

The sliding friction and wear rate characteristics of materials are frequently specified quantitatively by a coefficient of friction $\mu$ (sometimes termed a coefficient of sliding friction) and a coefficient of wear rate k. These quantities are conventionally defined by the following equations:

$$\mu = \frac{F_d}{F_n} \quad (1)$$

$$k = V/(F_n \times d) \quad (2)$$

wherein $F_d$ is the frictional resistance force that must be overcome in moving an object subjected to a force $F_n$ applied in a direction normal to the motion direction. V is the volume of material removed and d is the total sliding distance over the course of a wear exposure. Typically k is reported in units of $mm^3/N-m$, whereas $\mu$ is inherently a dimensionless ratio. In many cases, it is found that an initially high wear rate is followed by steady-state behavior corresponding to a relatively constant wear rate, so that reported values of k ordinarily refer to the steady-state behavior. Ideally, a bearing surface material has a low value of $\mu$ and a low value of k, corresponding to low friction and good wear rate.

A related characterization of the wear behavior of materials is provided by a so-called PV limit, by which is meant a value of pressure times velocity within which a bearing couple must operate to provide acceptable performance. Such testing may conveniently be carried out using a Falex Ring and Block Wear and Friction Tester. This equipment and the associated testing protocol are described in ASTM Test methods D2714-94 and G137-97. Generally stated, a block of material to be tested is mounted against a rotating metal ring and loaded against it with a selected test pressure. The ring is then spun, with the wear being determined by weighing the test block before the test and at selected intervals thereafter. The Falex wear rate may calculated from the following equation:

$$\text{wear rate}(cm^3/hr) = \frac{\text{weight loss}(g)}{\text{density}(g/cm^3) \times \text{test duration}(h)} \quad (3)$$

The PV limit is conventionally regarded as the value of pressure times velocity at which failure occurs. The PV limit of a body is typically determined by carrying out a wear exposure while increasing either or both parameters until a rapid and uncontrollable rise in friction occurs. Exemplary use of Falex testing is provided by U.S. Pat. No. 5,179,153

(col. 4, lines 25-50) and U.S. Pat. No. 5,789,523 (col. 4, line 63ff), which patents are incorporated herein in their entirety by reference thereto.

The Falex wear rate given by Equation (3) can be converted to the coefficient of wear resistance, or specific wear rate, k of Equation (2). As recognized by one of ordinary skill, wear rates determined by different testing methods ordinarily are correlated, but the exact numerical values depend somewhat on particular test conditions.

There have been numerous attempts to incorporate particulate and fibrous materials into fluoropolymer matrices to improve their friction and wear rate characteristics. In some cases, modestly improved wear rate results, but often at the cost of an unacceptably increased coefficient of friction. The portion of filler required to improve wear rate is often substantial.

Among the fillers that have been considered for PTFE are micrometer-scale particles of hard materials. Typically, these additions have improved wear rate by at most a factor of about a hundred over that of pure PTFE. However, in many cases the wear surface after use is decorated with the hard particles, which are large enough and protrude sufficiently to scratch the facing surface. These fillers also typically increase $\mu$, often to an unacceptable level.

It has been found that incorporation of submicron or nanoscale particles of certain types in PTFE reduces the propensity for the material to scratch the facing surface, but there are conflicting results as to how much the wear rate can be improved. In general, there is no basis for identifying and predicting the effect of particulate filler material on the critical physical properties, including wear rate, as many of the fillers tried have led to only a modest improvement, generally at most about one to two orders of magnitude, in wear rate k over that of the PTFE matrix without any such additions.

Consequently, there remains a need for polymer systems exhibiting even more improved low wear rates, especially fluoropolymer systems.

SUMMARY

In one aspect the present disclosure provides an article having a surface, wherein the surface comprises a film layer, wherein the film comprises a fluoropolymer in admixture with particulate filler material, characterized in that the fluoropolymer comprises carboxylic acid and/or carboxylate functionality, and wherein filler particles prior to combination with the fluoropolymer are characterized by:

(a) an irregular shape, and (b) a size distribution as determined by dynamic light scattering wherein a $d_{50}$ value by volume is in the range from about 50 nm to about 500 nm, and/or a size distribution as determined by static light scattering wherein a $d_{50}$ value by volume is in the range from about 80 nm to about 1500 nm; and wherein the article surface demonstrates a steady state wear rate of at most about $5 \times 10^{-7}$ mm$^3$/N-m and a coefficient of friction of less than about 0.3, as measured on a tribometer using a Type 304 stainless steel counterface having a surface roughness characterized by a value of about R(rms)=161 nm with a standard deviation of 35 nm, and with the article under a loading of 6.25 MPa and in reciprocating motion at a velocity of 50.8 mm/s.

In another aspect the present disclosure is a process for producing an article comprising on its surface a film layer, wherein the film layer comprises a fluoropolymer composite material, the process comprising the steps of:

(1) combining a fluoropolymer with a particulate inorganic filler to form a fluoropolymer composite material;

(2) in an atmosphere substantially absent of liquid solvent but in the presence of ambient water vapor and oxygen gas, contacting the fluoropolymer composite material with at least one surface of a substrate;

(3) repetitively moving the fluoropolymer composite material and substrate against each other, while maintaining continuous contact between them, in a manner that provides sufficient energy to:

(i) physically deposit a thin film layer of fluoropolymer composite onto the surface of the substrate;

(ii) break chemical bonds in the fluoropolymer;

(ii) break chemical bonds in the fluoropolymer; and (iii) form fluoropolymer composite material having carboxylic acid functionality;

and (4) continuing step (3) until a fluoropolymer composite film layer is adhered to the surface of the substrate; wherein the composite film layer is characterized in that the fluoropolymer composite film layer comprises carboxylic acid and/or carboxylate functionality, and wherein the filler particles prior to combination with the fluoropolymer are characterized by:

(a) an irregular shape, and (b) a size distribution as determined by dynamic light scattering wherein a $d_{50}$ value by volume is in the range from about 50 nm to about 500 nm, and/or a size distribution as determined by static light scattering wherein a $d_{50}$ value by volume is in the range from about 80 nm to about 1500 nm; wherein the article surface demonstrates a steady state wear rate of at most about $1 \times 10^{-6}$ mm$^3$/N-m and a coefficient of friction of less than about 0.3, as measured on a tribometer using a Type 304 stainless steel counterface having a surface roughness characterized by a value of about R(rms)=161 nm with a standard deviation of 35 nm, and with the article under a loading of 6.25 MPa and in reciprocating motion at a velocity of 50.8 mm/s.

Still another aspect provides an article comprising a metallic surface having a film disposed thereon, wherein the film comprises the foregoing composition, and wherein the film is chemically bonded to the surface. Also provided is a method of forming a film on the surface of a substrate, the film comprising the forgoing composition, the method of forming the film comprising the steps of forming an implement from the foregoing composition and contacting the implement with the substrate in a repetitive motion, the implement contacting the substrate surface with sufficient force to deposit the film thereon.

BRIEF DESCRIPTION OF THE DRAWINGS

Embodiments of the disclosure will be more fully understood and further advantages will become apparent when reference is had to the following detailed description of the preferred embodiments and the accompanying drawing, in which.

DETAILED DESCRIPTION

Figure 1A:
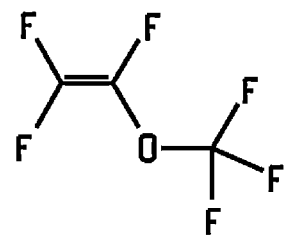
FIGS. 1A-1C are structures of certain perfluoroolefin monomers useful in the practice of the present process.

An aspect of the subject matter hereof provides a fluoropolymer composite body comprising a fluoropolymer matrix and particulate filler material dispersed therein. Embodiments of the fluoropolymer composite body exhibit improved wear rates, i.e. wear rates that are lower than those provided by comparable fluoropolymers without particulate filler material loading. Certain embodiments of the present fluoropolymer composite body beneficially exhibit low specific wear rates.

For the purposes of the present disclosure, the materials of the present disclosure achieve a wear rate of at most about $5\times10^{-7}$ when tested according to the methods described herein. More importantly, the wear rate is a steady state value—that is, the wear rate reaches a minimum value during the test, and upon attaining the minimum does not substantially increase for the duration of the test once said minimum is reached. This is in contradiction to a "non-steady state" wear rate, which is evidenced by a minimum being reached but not being sustained throughout the test. Some conventional materials do not demonstrate a steady state wear rate, but instead demonstrate non-steady state behavior.

A steady state wear rate is the specific wear rate that is established during that part of the test when the specific wear rate remains substantially constant (the specific wear rate versus sliding distance curve flattens out considerably with less than 30% difference between the specific wear rates) during a minimum of three time intervals spanning a total time duration of at least 18 h, with ideally no single interval exceeding 8 h. However, one time interval during the steady state can be as long as 16 h.

For the purpose of the present disclosure, reference herein to the wear rate of materials of this disclosure is understood to be a "steady state" wear rate as described above. For the purpose of the present disclosure, "wear rate" and "wear resistance" can be considered to be interchangeable terms.

A fluoropolymer composite body as provided herein may be employed in many applications and can have a variety of shapes and cross sections. In an embodiment, the shape of the article can be a simple geometrical shape (e.g., spherical, cylindrical, polygonal, and the like) or a more complex geometrical shape (e.g., irregular shapes).

Embodiments of the fluoropolymer composite body can be used in many structures, parts, and components in the automotive, industrial, aerospace, and sporting equipment industries, to name but a few industries where articles having superior tribology characteristics are advantageous. Typical applications include, but are not limited to, mechanical parts (e.g., bearing, joints, pistons, etc.), structures having load bearing surfaces, sporting equipment, machine parts and equipment, and the like.

In an aspect of the present disclosure, use of the fluoropolymer composite body is especially beneficial in bearing and seal applications. In general, an embodiment of the fluoropolymer composite body may be configured to have one or more surfaces appointed to be in contact with one or more surfaces of a facing object. The area of abutment of the fluoropolymer composite body and the counterface generally define a contact surface, which may have any advantageous configuration. Possible contact surfaces include substantially planar surfaces and the shape of some or all of a right circular cylinder. Possible cross-sectional shapes of the composite body thus include, but are not limited to, a polygon, a curved cross-section, irregular, and combinations thereof.

It should also be noted that the tribological properties of the present fluoropolymer composite body can be designed for a particular application. Thus, embodiments of the present disclosure can provide articles that can satisfy many different requirements for different industries and for particular components.

Bearing applications, in which the abutting areas of the fluoropolymer composite body and the facing object are in relative motion, benefit from use of embodiments that provide low friction and/or high steady state wear rate.

The steady state wear rate of a polymeric composite body may be affected by the nature of the transfer film formed during sliding contact of a surface of the composite body with a bearing surface, also termed a counterface, of the other member of a bearing couple. When a fluoropolymer without filler is slid against a typical counterface, such as a steel surface, a transfer layer may form and build quickly, but ordinarily deteriorates rapidly, as flake-like portions break off. The present inventors have observed that a durable, stable transfer film is formed with the fluoropolymer composites described herein. The transfer film may be tenaciously adhered to the counterface without exhibiting flaking or similar deterioration during continuous relative motion of the surfaces.

By "tenaciously adhered" it is meant that the film forms a mechanical and/or physical bond with the surface, and is not easily removed from said surface. Such bonding is manifested by the inability to brush off, wash off or peel off the film without difficulty. For example, removal by solvents such as, for example, dimethylsulfoxide (DMOSO), isopropyl alcohol and Flutec™ PP11 can be ineffective at removing the film from the counter surface.

Figure 4:
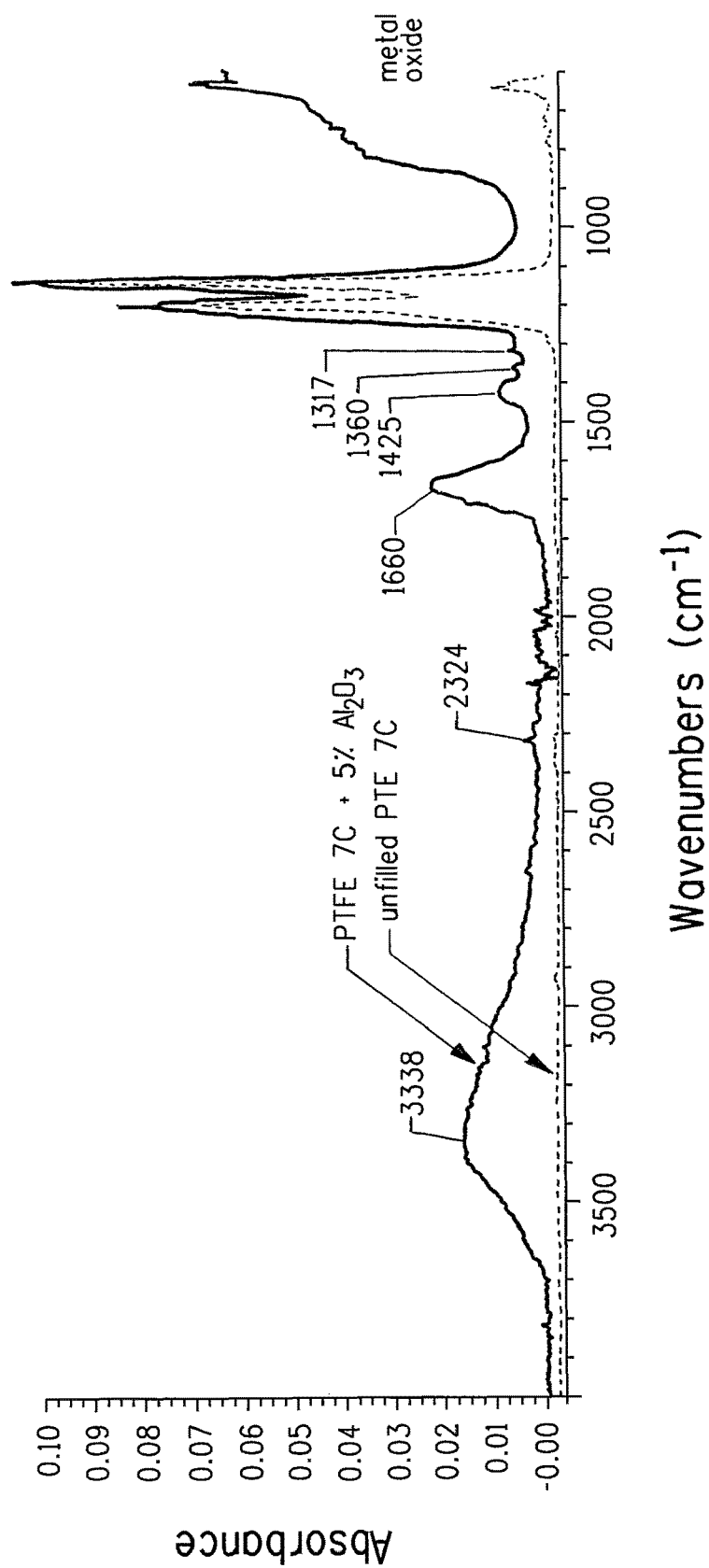
FIG. 4 depicts the IR spectra of transfer films derived from filled and unfilled PTFE polymers.
Figure 5A:
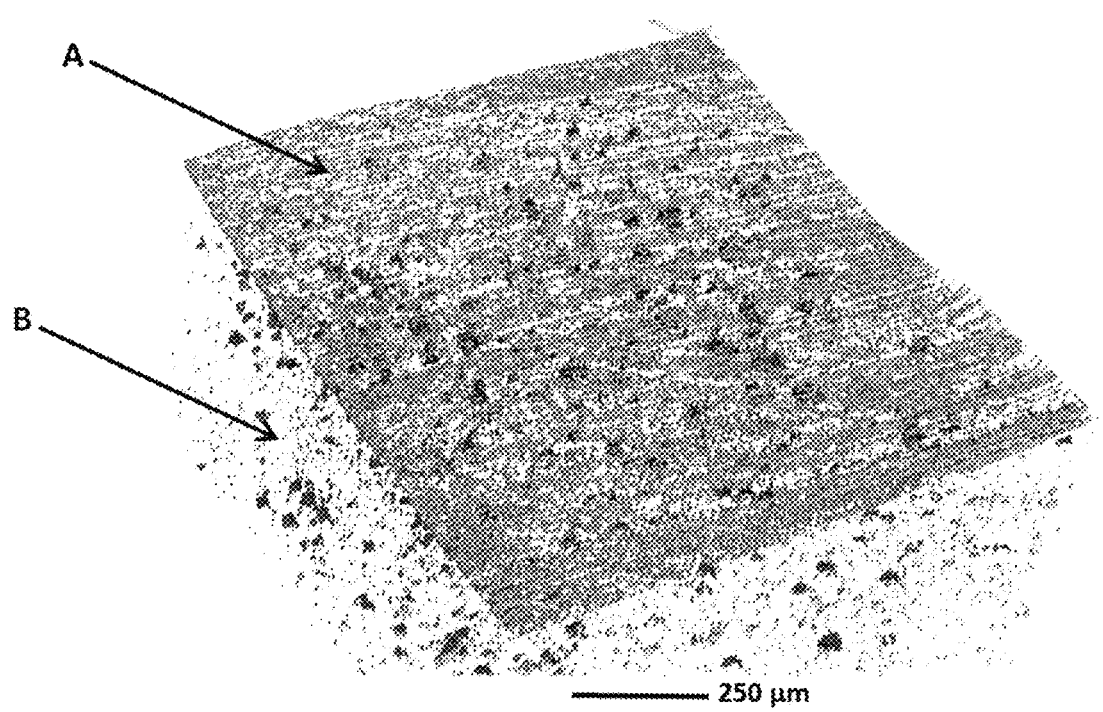
FIG. 5A depicts the 3D X-ray microtomograph of a running film from a top view.
Figure 5B:
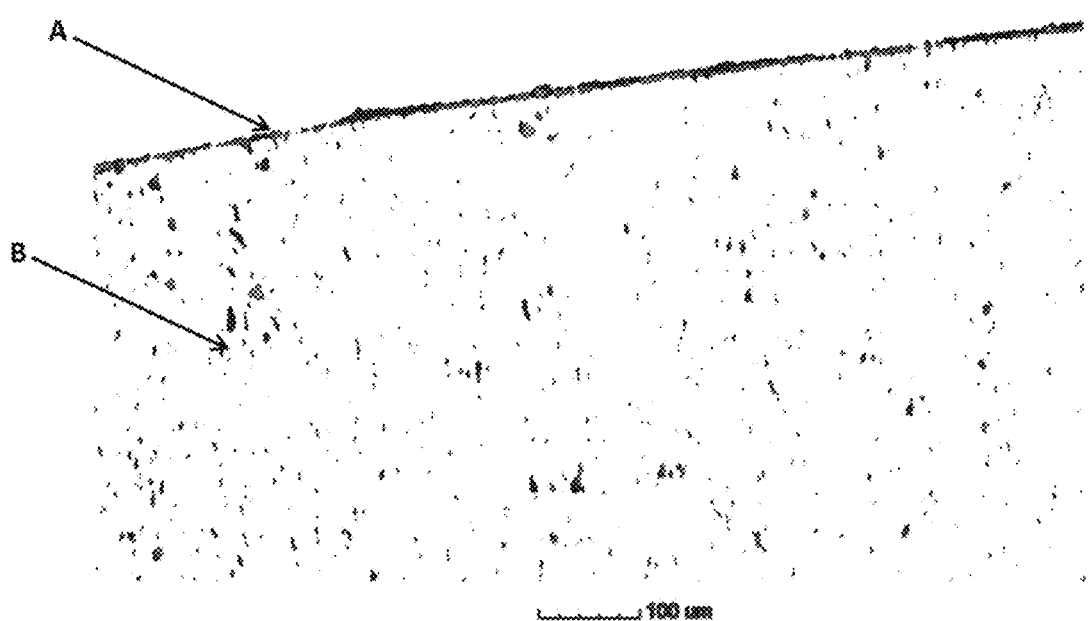
FIG. 5B depicts the 3D X-ray microtomograph of a running film from a side view.

Further, it has been found that repetitive frictional contact between a filled fluoropolymer article of the present disclosure and a counter surface can form a differentiated layer of a PTFE composite—referred to herein as a "running film"—on the worn fluoropolymer surface. By "differentiated layer" it is meant that the PTFE composition that develops on the surface is chemically differentiated from the bulk of the PTFE composition, whereby the running film comprises carboxylic acid and/or carboxylate functionality that can be detected by infrared spectroscopy (FIG. 4), and further comprises a build-up—that is, a higher concentration of inorganic filler than can be found in the bulk of the fluoropolymer—that can be detected by 3D X-ray microtomography (FIG. 5A and FIG. 5B). In 5A, the 3D X-ray image of worn PTFE/alumina composite shows a build-up of alumina particles in worn area (A) of the polymer surface. Area B is the bulk polymer matrix. Alumina additive shows up as grey/black in the figure, and PTFE shows as the white areas. FIG. 5B shows another angle, where the worn surface (A) depicts a high concentration of alumina relative to the bulk (B).

In the present disclosure, deposition of the transfer film is believed to result, in one embodiment, from repetitive frictional contact between the filled PTFE article and the counter surface. The repetitive frictional contact of the two surfaces as described herein can be linear reciprocating or circular motion. The contact between the surfaces is such that a thin film is formed (on the order of from about 200- to about 5000 nm thick) on at least one of the surfaces.

Without being held to theory, applicants believe that in the substantial absence of a solvent and in the presence of ambient water vapor and oxygen, the transfer film formed on the counter surface becomes both chemically and physically bonded to said surface by virtue of carboxylic acid and/or carboxylic acid salts created by mechanochemistry that takes place between the fluoropolymer surface and the substrate counter surface under these conditions, thereby forming chemical bonds between the transfer film and the counter surface, whereby said film provides a steady state wear rate that is lower than that wherein a transfer film is not formed and/or not chemically bonded. While carboxylic acid functionality has been known to form in some PTFE fluoropolymers as a result of processing (see, for example, Journal of Flourine Chemistry 95 (1999), 71-84), the high molecular weight of the PTFE in other applications is typically believed to dilute the physical and/or chemical effects of the functionality because of the relative paucity of end group functionality.

In one embodiment of the present disclosure, an article of the present disclosure comprises two surfaces capable of frictional contact with each other wherein either or both surfaces comprise transfer film and/or running films. It can be preferred in some embodiments of the present disclosure that the transfer film and/or the running film, where present, is continuous. For the avoidance of doubt, by "continuous" it is meant that no surface area is left uncovered by a transfer film and/or a running film within the region of coverage by the film. There are no gaps, spaces, voids, cracks or craters that expose a metal surface. It can also be preferred that a continuous film also completely cover the surface(s) of the article or articles. By "complete" coverage it is meant that no surface of the article that is designed for frictional contact with another surface—i.e., no "contact surface"—is left uncovered by a either a continuous transfer film or a continuous running film on any of the contact surface.

The carboxylic acid and/or carboxylic acid salts present in the filled PTFE polymers of the present disclosure can form complexes with metals on the counter surface; simultaneously metals from the counter surface can be transferred to the PTFE polymer part to form the differentiated running film. Additionally, the carboxylic acid and/or carboxylic acid salts present in the filled PTFE running film and transfer film can form complexes with the metal oxide filler.

The beneficial improvement in wear rate of some embodiments of the composite body is seen in applications wherein the relative sliding motion of the composite body against the bearing surface is either reciprocating or oscillatory (e.g. a piston within a pressure cylinder) or unidirectional (e.g. a shaft rotating within a supporting bearing).

Fluoropolymers

Fluoropolymers are used herein to prepare a composition of matter useful in polymeric composite bodies by admixture with a metal oxide or other suitable particulate filler material. For that purpose an individual fluoropolymer can be used alone; mixtures or blends of two or more different kinds of fluoropolymers can be used as well. Fluoropolymers useful in the practice of this disclosure are prepared from at least one unsaturated fluorinated monomer (fluoromonomer). A fluoromonomer suitable for use herein preferably contains at least about 35 wt. % fluorine, and preferably at least about 50 wt. % fluorine, and can be an olefinic monomer with at least one fluorine or fluoroalkyl group or fluoroalkoxy group attached to a doubly-bonded carbon. In one embodiment, a fluoromonomer suitable for use herein is tetrafluoroethylene (TFE). In a further aspect, the foregoing composition of matter is formed into a fluoropolymer composite body.

An especially useful fluoropolymer for this composition of matter and composite body is thus polytetrafluoroethylene (PTFE), which refers to (a) polymerized tetrafluoroethylene (PTFE) by itself without any significant comonomer present, i.e. a homopolymer of TFE, and (b) modified PTFE, which is a copolymer of TFE with such small concentrations of comonomer that the melting point of the resultant polymer is not substantially reduced below that of PTFE (reduced, for example, by less than about 8%, less than about 4%, less than about 2%, or less than about 1%). Modified PTFE contains a small amount of comonomer modifier that improves film forming capability during baking (fusing). Comonomers useful for such purpose typically are those that introduce bulky side groups into the molecule, and specific examples of such monomers are described below. The concentration of such comonomer is preferably less than 1 wt %, and more preferably less than 0.5 wt %, based on the total weight of the TFE and comonomer present in the PTFE. A minimum amount of at least about 0.05 wt % comonomer is preferably used to have a significant beneficial effect on processability. The presence of the comonomer is believed to cause a lowering of the average molecular weight.

PTFE (and modified PTFE) typically have a melt creep viscosity of at least about $1 \times 10^6$ Pa·s and preferably at least about $1 \times 10^8$ Pa·s. With such high melt viscosity, the polymer does not flow in the molten state and therefore is not a melt-processible polymer. The measurement of melt creep viscosity is disclosed in col. 4 of U.S. Pat. No. 7,763,680. The high melt viscosity of PTFE arises from its extremely high molecular weight (Mw), e.g. at least about $10^6$. Additional indicia of this high molecular weight include the high melting temperature of PTFE, which is at least 330° C., usually at least 331° C. and most often at least 332° C. (all measured on first heat). The non-melt flowability of the PTFE, arising from its extremely high melt viscosity, manifests itself as a melt flow rate (MFR) of 0 when measured in accordance with ASTM D 1238-10 at 372° C. and using a 5 kg weight. This high melt viscosity also leads to a much lower heat of fusion obtained for the second heat (e.g. up to 55 J/g) as compared to the first heat (e.g. at least 75 J/g) to melt the PTFE, representing a difference of at least 20 J/g. The high melt viscosity of the PTFE reduces the ability of the molten PTFE to recrystallize upon cooling from the first heating. The high melt viscosity of PTFE enables its standard specific gravity (SSG) to be measured, which measurement procedure (ASTM D 4894-07, also described in U.S. Pat. No. 4,036,802) includes sintering the SSG sample free standing (without containment) above its melting temperature without change in dimension of the SSG sample. The SSG sample does not flow during the sintering.

Low molecular weight PTFE is commonly known as PTFE micropowder, which distinguishes it from the PTFE described above. The molecular weight of PTFE micropowder is low relative to PTFE, i.e. the molecular weight (Mw) is generally in the range of $10^4$ to $10^5$. The result of this lower molecular weight of PTFE micropowder is that it has fluidity in the molten state, in contrast to PTFE which is not melt flowable. The melt flowability of PTFE micropowder can be characterized by a melt flow rate (MFR) of at least about 0.01 g/10 min, preferably at least about 0.1 g/10 min, more preferably at least about 5 g/10 min, and still more preferably at least about 10 g/10 min., as measured in accordance with ASTM D 1238-10, at 372° C. using a 5 kg weight on the molten polymer.

While PTFE micropowder is characterized by melt flowability because of its low molecular weight, the PTFE micropowder by itself is not melt fabricable, i.e., an article molded from the melt of PTFE micropowder has extreme brittleness, and an extruded filament of PTFE micropowder, for example, is so brittle that it breaks upon flexing. Because of its low molecular weight (relative to non-melt-flowable PTFE), PTFE micropowder has no strength, and compression molded plaques for tensile or flex testing generally cannot be made from PTFE micropowder because the plaques crack or crumble when removed from the compression mold, which prevents testing for either the tensile property or the MIT Flex Life. Accordingly, the micropowder is assigned zero tensile strength and an MIT Flex Life of zero cycles. In contrast, PTFE is flexible, rather than brittle, as indicated for example by an MIT flex life [ASTM D-2176-97a(2007)], using an 8 mil (0.21 mm) thick compression molded film] of at least 1000 cycles, preferably at least 2000 cycles. As a result, PTFE micropowder finds use as a blend component with other polymers such as PTFE itself and/or copolymers of TFE with other monomers such as those described below.

In other embodiments, a fluoromonomer suitable for use herein, by itself to prepare a homopolymer or in copolymerization with other comonomers such as TFE, can be represented by the structure of the following Formula I:

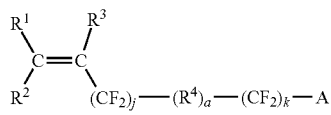

wherein $R^1$ and $R^2$ are each independently selected from H, F and Cl;
$R^3$ is H, F, or a $C_1$–$C_{12}$, or $C_1$–$C_8$, or $C_1$–$C_6$, or $C_1$–$C_4$ straight-chain or branched, or a $C_3$–$C_{12}$, or $C_3$–$C_8$, or $C_3$–$C_6$ cyclic, substituted or unsubstituted, alkyl radical;
$R^4$ is a $C_1$–$C_{12}$, or $C_1$–$C_8$, or $C_1$–$C_6$, or $C_1$–$C_4$ straight-chain or branched, or a $C_3$–$C_{12}$, or $C_3$–$C_8$, or $C_3$–$C_6$ cyclic, substituted or unsubstituted, alkylene radical;
A is H, F or a functional group; a is 0 or 1; and j and k are each independently 0 to 10; provided that, when a, j and k are all 0, at least one of $R^1$, $R^2$, $R^3$ and A is not F.

An unsubstituted alkyl or alkylene radical as described above contains no atoms other than carbon and hydrogen. In a substituted hydrocarbyl radical, one or more halogens selected from Cl and F can be optionally substituted for one or more hydrogens; and/or one or more heteroatoms selected from O, N, S and P can optionally be substituted for any one or more of the in-chain (i.e. non-terminal) or in-ring carbon atoms, provided that each heteroatom is separated from the next closest heteroatom by at least one and preferably two carbon atoms, and that no carbon atom is bonded to more than one heteroatom. In other embodiments, at least 20%, or at least 40%, or at least 60%, or at least 80% of the replaceable hydrogen atoms are replaced by fluorine atoms. Preferably a Formula I fluoromonomer is perfluorinated, i.e. all replaceable hydrogen atoms are replaced by fluorine atoms.

In a Formula I compound, a linear $R^3$ radical can, for example, be a $C_b$ radical where b is 1, 2, 3, 4, 5, 6, 7, 8, 9, 10, 11 or 12 and the radical can contain from 1 up to 2b+1 fluorine atoms. For example, a $C_4$ radical can contain from 1 to 9 fluorine atoms. A linear $R^3$ radical is perfluorinated with 2b+1 fluorine atoms, but a branched or cyclic radical will be perfluorinated with fewer than 2b+1 fluorine atoms. In a Formula I compound, a linear $R^4$ radical can, for example, be a $C_c$ radical where c is 1, 2, 3, 4, 5, 6, 7, 8, 9, 10, 11 or 12 and the radical can contain from 1 to 2c fluorine atoms. For example, a $C_6$ radical can contain from 1 to 12 fluorine atoms. A linear $R^4$ radical is perfluorinated with 2c fluorine atoms, but a branched or cyclic radical will be perfluorinated with fewer than 2c fluorine atoms.

Examples of a $C_1$–$C_{12}$ straight-chain or branched, substituted or unsubstituted, alkyl or alkylene radical suitable for use herein can include or be derived from a methyl, ethyl, n-propyl, i-propyl, n-butyl, sec-butyl, tert-butyl, n-pentyl, n-hexyl, n-octyl, trimethylpentyl, allyl and propargyl radical. Examples of a $C_3$–$C_{12}$ cyclic aliphatic, substituted or unsubstituted, alkyl or alkylene radical suitable for use herein can include or be derived from an alicyclic functional group containing in its structure, as a skeleton, cyclohexane, cyclooctane, norbornane, norbornene, perhydro-anthracene, adamantane, or tricyclo-[5.2.1.0$^{2.6}$]-decane groups.

Functional groups suitable for use herein as the A substituent in Formula I include ester, alcohol, acid (including carbon-, sulfur-, and phosphorus-based acid) groups, and the salts and halides of such groups; and cyanate, carbamate, and nitrile groups. Specific functional groups that can be used include —SO$_2$F, —CN, —COOH, and —CH$_2$—Z wherein —Z is —OH, —OCN, —O—(CO)—NH$_2$, or —OP(O)(OH)$_2$.

Formula I fluoromonomers that can be homopolymerized include vinyl fluoride (VF), to prepare polyvinyl fluoride (PVF), and vinylidene fluoride (VF$_2$) to prepare polyvinylidene fluoride (PVDF), and chlorotrifluoroethylene to prepare polychlorotrifluoroethylene. Examples of Formula I fluoromonomers suitable for copolymerization include those in a group such as ethylene, propylene, 1-butene, 1-hexene, 1-octene, chlorotrifluoroethylene (CTFE), trifluoroethylene, hexafluoroisobutylene, vinyl fluoride (VF), vinylidene fluoride (VF$_2$), and perfluoroolefins such as hexafluoropropylene (HFP), and perfluoroalkyl ethylenes such as perfluoro(butyl)ethylene (PFBE). A preferred monomer for copolymerization with any of the above named comonomers is tetrafluoroethylene (TFE).

In yet other embodiments, a fluoromonomer suitable for use herein, by itself to prepare a homopolymer or in copolymerization with TFE and/or any of the other comonomers described above, can be represented by the structure of the following Formula II:

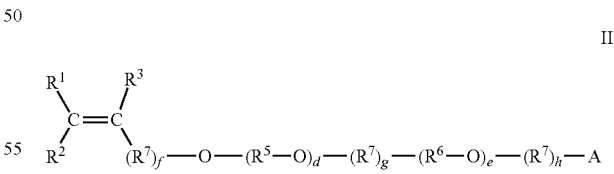

wherein $R^1$ through $R^3$ and A are each as set forth above with respect to Formula I; d and e are each independently 0 to 10; f, g and h are each independently 0 or 1; and $R^5$ through $R^7$ are the same radicals as described above with respect to $R^4$ in Formula I except that when d and e are both non-zero and g is zero, $R^5$ and $R^6$ are different $R^4$ radicals.

Formula II compounds introduce ether functionality into fluoropolymers suitable for use herein, and include fluorovinyl ethers such as those represented by the following formula: 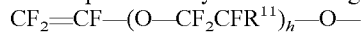

$CF_2CFR^{12}SO_2F$, wherein $R^{11}$ and $R^{12}$ are each independently selected from F, Cl or a perfluorinated alkyl group having 1 to 10 carbon atoms, and h=0, 1 or 2. Examples of polymers of this type that are disclosed in U.S. Pat. No. 3,282,875 include $CF_2=CF-O-CF_2CF(CF_3)-O-CF_2CF_2SO_2F$ and perfluoro(3,6-dioxa-4-methyl-7-octene-sulfonyl fluoride), and examples that are disclosed in U.S. Pat. Nos. 4,358,545 and 4,940,525 include $CF_2=CF-O-CF_2CF_2SO_2F$. Another example of a Formula II compound is $CF_2=CF-O-CF_2-CF(CF_3)-O-CF_2CF_2CO_2CH_3$, the methyl ester of perfluoro(4,7-dioxa-5-methyl-8-nonenecarboxylic acid), as disclosed in U.S. Pat. No. 4,552,631. Similar fluorovinyl ethers with functionality of nitrile, cyanate, carbamate, and phosphonic acid are disclosed in U.S. Pat. Nos. 5,637,748, 6,300,445, and 6,177,196. Methods for making fluoroethers suitable for use herein are set forth in the U.S. patents listed above in this paragraph, and each of the U.S. patents listed above in this paragraph is by this reference incorporated in its entirety as a part hereof for all purposes.

Figure 1B:
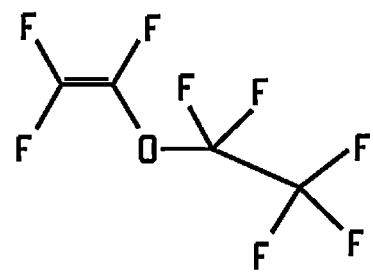
Figure 1C:
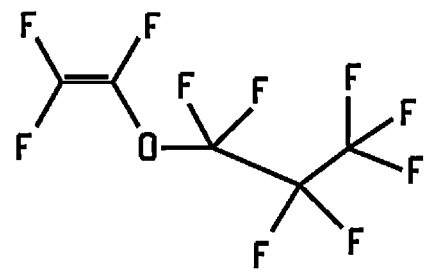

Particular Formula II compounds suitable for use herein as a comonomer include fluorovinyl ethers such as perfluoro(allyl vinyl ether) and perfluoro(butenyl vinyl ether). Preferred fluorovinyl ethers include perfluoro(alkyl vinyl ethers) (PAVE), where the alkyl group contains 1 to 5 carbon atoms, with perfluoro(ethyl vinyl ether) (PEVE) and perfluoro(propyl vinyl ether) (PPVE), and perfluoro(methyl vinyl ether) (PMVE) being preferred. The structures of these preferred fluorovinyl ethers are respectively depicted by FIGS. 1A-1C.

In yet other embodiments, a fluoromonomer suitable for use herein, by itself to prepare a homopolymer or in copolymerization with TFE and/or any of the other comonomers described above, can be represented by the structure of the following Formula III:

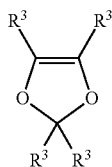

III wherein each $R^3$ is independently as described above in relation to Formula I. Suitable Formula III monomers include perfluoro-2,2-dimethyl-1,3-dioxole (PDD).

In yet other embodiments, a fluoromonomer suitable for use herein, by itself to prepare a homopolymer or in copolymerization with TFE and/or any of the other comonomers described above, can be represented by the structure of the following Formula IV:

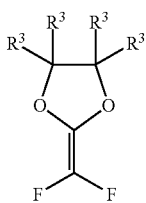

IV wherein each $R^3$ is independently as described above in relation to Formula I. Suitable Formula IV monomers include perfluoro-2-methylene-4-methyl-1,3-dioxolane (PMD).

In various embodiments, fluoropolymer copolymers suitable for use herein can be prepared from any two, three, four or five of these monomers: TFE and a Formula I, II, III and IV monomer. The following are thus representative combinations that are available: TFE/Formula I; TFE/Formula II; TFE/Formula III; TFE/Formula IV; TFE/Formula I/Formula II; TFE/Formula I/Formula III; TFE/Formula I/Formula IV; Formula I/Formula II; Formula I/Formula III; and Formula I/Formula IV. Provided that at least two of the five kinds of monomers are used, a unit derived from each monomer can be present in the final copolymer in an amount of at least about 1 wt %, or at least about 5 wt %, or at least about 10 wt %, or at least about 15 wt %, or at least about 20 wt %, and yet no more than about 99 wt %, or no more than about 95 wt %, or no more than about 90 wt %, or no more than about 85 wt %, or no more than about 80 wt % (based on the weight of the final copolymer); with the balance being made up of one, two, three or all of the other five kinds of monomers.

A fluoropolymer as used herein can also be a mixture of two or more of the homo- and/or copolymers described above, which is usually achieved by dry blending. A fluoropolymer as used herein can also, however, be a polymer alloy prepared from two or more of the homo- and/or copolymers described above, which can be achieved by melt kneading the polymer together such that there is mutual dissolution of the polymer, chemical bonding between the polymers, or dispersion of domains of one of the polymers in a matrix of the other.

Tetrafluoroethylene polymers suitable for use herein can be produced by aqueous polymerization (as described in U.S. Pat. No. 3,635,926) or polymerization in a perhalogenated solvent (U.S. Pat. No. 3,642,742) or hybrid processes involving both aqueous and perhalogenated phases (U.S. Pat. No. 4,499,249). Free radical polymerization initiators and chain transfer agents are used in these polymerizations and have been widely discussed in the literature. For example, persulfate initiators and alkane chain transfer agents are described for aqueous polymerization of TFE/PAVE copolymers. Fluorinated peroxide initiators and alcohols, halogenated alkanes, and fluorinated alcohols are described for nonaqueous or aqueous/nonaqueous hybrid polymerizations.

Various fluoropolymers suitable for use herein include those that are thermoplastic, which are fluoropolymers that, at room temperature, are below their glass transition temperature (if amorphous), or below their melting point (if semi-crystalline), and that become soft when heated and become rigid again when cooled without the occurrence of any appreciable chemical change. A semi-crystalline thermoplastic fluoropolymer can have a heat of fusion of at least about 1 J/g, or at least about 4 J/g, or at least about 8 J/g, when measured by Differential Scanning Calorimetry (DSC) at a heating rate of 10° C./min (according to ASTM D 3418-08). Various fluoropolymers suitable for use herein can additionally or alternatively be characterized as melt-processible, and melt-processible fluoropolymers can also be melt-fabricable. A melt-processible fluoropolymer can be processed in the molten state, i.e. fabricated from the melt using conventional processing equipment such as extruders and injection molding machines, into shaped articles such as films, fibers and tubes. A melt-fabricable fluoropolymer can be used to produce fabricated articles that exhibit sufficient strength and toughness to be useful for their intended purpose despite having been processed in the molten state. This useful strength is often indicated by a lack of brittleness in the fabricated article, and/or an MIT Flex Life of at least about 1000 cycles, or at least about 2000 cycles (measured as described above), for the fluoropolymer itself.

Examples of thermoplastic, melt-processible and/or melt-fabricable fluoropolymers include copolymers of tetrafluoroethylene (TFE) and at least one fluorinated copolymerizable monomer (comonomer) present in the polymer in sufficient amount to reduce the melting point of the copolymer below that of PTFE, e.g. to a melting temperature no greater than 315° C. Such a TFE copolymer typically incorporates an amount of comonomer into the copolymer in order to provide a copolymer which has a melt flow rate (MFR) of at least about 1, or at least about 5, or at least about 10, or at least about 20, or at least about 30, and yet no more than about 100, or no more than about 90, or no more than about 80, or no more than about 70, or no more than about 60, as measured according to ASTM D-1238-10 using a weight on the molten polymer and melt temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s. Melt viscosity in Pa·s is 531,700/MFR in g/10 min.

In general, thermoplastic, melt-processible and/or melt-fabricable fluoropolymers as used herein include copolymers that contain at least about 40 mol %, or at least about 45 mol %, or at least about 50 mol %, or at least about 55 mol %, or at least about 60 mol %, and yet no more than about 99 mol %, or no more than about 90 mol %, or no more than about 85 mol %, or no more than about 80 mol %, or no more than about 75 mol % TFE; and at least about 1 mol %, or at least about 5 mol %, or at least about 10 mol %, or at least about 15 mol %, or at least about 20 mol %, and yet no more than about 60 mol %, or no more than about 55 mol %, or no more than about 50 mol %, or no more than about 45 mol %, or no more than about 40 mol % of at least one other monomer. Suitable comonomers to polymerize with TFE to form melt-processible fluoropolymers include a Formula I, II, III and/or IV compound; and, in particular, a perfluoroolefin having 3 to 8 carbon atoms [such as hexafluoropropylene (HFP)], and/or perfluoro(alkyl vinyl ethers) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFP/VF$_2$). Additional melt-processible fluoropolymers are the copolymers of ethylene (E) or propylene (P) with TFE or chlorinated TFE (CTFE), notably ETFE, ECTFE and PCTFE. Also useful in the same manner are film-forming polymers of polyvinylidene fluoride (PVDF) and copolymers of vinylidene fluoride as well as polyvinyl fluoride (PVF) and copolymers of vinyl fluoride.

The present composition of matter and fluoropolymer composite bodies constructed therewith may be formed using a wide variety of materials as the particulate filler material. Non-limiting examples of particulate filler material that may be incorporated in the present composition include both metals and inorganic substances.

Exemplary metals include, but are not limited to, iron, nickel, cobalt, chromium, vanadium, titanium, molybdenum, aluminum, the rare earth metals, and alloys thereof, including steels and stainless steels.

Non-limiting examples of inorganic substances include: oxides of silicon, aluminum, titanium, iron, zinc, zirconium, alkaline earth metals, and boron; nitrides of boron, aluminum, titanium, and silicon; borides of rare earth metals such as lanthanum; carbides of silicon, boron, iron, tungsten, and vanadium; sulfides of molybdenum, tungsten, and zinc; fluorides of alkaline earth and rare earth metals; submicron and nanoscale carbon-based materials, including graphitic materials such as graphenes and graphite oxides that are optionally chemically functionalized, carbon black, carbon fiber, nanotubes, and spherical, $C_{60}$-based materials; and mixed oxides and fluorides, by which are meant compounds containing at least two cations other than the oxygen or fluorine. Exemplary mixed oxides include silicates, vanadates, titanates, and ferrites, as well as natural or synthetic clays in either platy or rod-like forms. Either a single particulate material or a combination of more than one particulate material may be incorporated as the particulate filler material, and it is to be understood that the materials herein enumerated may include dopants or incidental impurities.

The particles of the filler material may have any shape, including irregular particles and high or low aspect ratio particles such as needles, rods, whiskers, fibers, or platelets. In some embodiments, the particles have a size distribution with at least one submicron dimension. In some embodiments, the irregular shapes arise from crushing or milling processes. The particles may also have round or faceted shapes and may be substantially fully dense or have some degree of porosity. Faceted shapes may include needle-like sharp points or multiple, substantially planar faces. The particulate fillers may be composed of individual primary particles. Alternatively, some or all of the particulate filler material may be in the form of an aggregation or agglomeration of such primary particles. In some embodiments, partially agglomerated particles have an overall shape which can be irregular or fractal in character. In some instances, the particles exhibit substantial internal porosity, either by virtue of the partially agglomerated state or as a consequence of the preparation procedure used.

In some embodiments, the filler material comprises submicron particles or nanoparticles. As used herein, the term "submicron particle" refers to a particle that is part of an ensemble of like particles having a size distribution, as measured in at least one dimension, that is characterized by a $d_{50}$ value (median size) of at most 0.5 µm (500 nm). The term "nanoparticle" refers to a particle that is part of an ensemble of like particles having a size distribution in at least one dimension that is characterized by a $d_{50}$ value of at most 0.1 µm (100 nm). Nanoparticles thus fall within the larger class of submicron particles.

In some cases, a portion of the starting particulate filler material comprises aggregated or agglomerated particles that are larger than the primary particle size. In an embodiment, the primary particle size may be 100 nm or smaller, whereas the agglomerates may be as large as 2 µm or more, as measured in at least one dimension. In another embodiment, the primary particle size may be 50 nm or smaller and the agglomerates as large as 10 µm or larger in at least one dimension. It is believed that some or all these large particles may break apart or deagglomerate subsequently, either during the formation of the fluoropolymer composite body, or as the particles are newly exposed at the bearing surface as a wear process proceeds. Thus, larger measures of particle size used herein to characterize a particulate filler material in its initial state, before it is incorporated into the present fluoropolymer composite body, do not necessarily persist in the composite body or in a transfer film formed therefrom, and smaller particles formed thereby may have smaller sizes.

A number of techniques are known in the art for characterizing the size of small particles by either direct or indirect measurements. It is known that different techniques give different size results for the same particles, especially ones that have non-spherical or irregular shape or a multi-modal distribution. For example, a widely-used indirect method is the Brunauer-Emmett-Teller (BET) technique, which provides a determination of the aggregate effective surface area of a known mass of particles, based on a measurement of the amount of gas that can be adsorbed on the surface of the ensemble of particles. The amount of gas is used to calculate a specific surface area of the ensemble (area per unit mass). By assuming the ensemble to consist of monodisperse, fully dense spheres, a characteristic size may be inferred. It will be appreciated that for BET measurements, the larger the surface area the smaller the equivalent or characteristic size.

However, particles that feature significant porosity will adsorb far more gas than they would based solely on their external dimensions, thus leading to an unrealistically small inferred size from the BET measurement. Similar, but likely smaller, discrepancies arise for particles that exhibit fractal, jagged, or otherwise irregular surfaces and thus enhanced surface area.

In an embodiment, particulate filler materials useful in the practice of the present disclosure may have a BET-determined specific surface area of at least about 22 $m^2/g$. In other embodiments the material may have a BET-determined specific surface area of at least about 43 $m^2/g$, at least about 7 $m^2/g$, at least about 2 $m^2/g$, or at least about 0.3 $m^2/g$.

At the other extreme, direct imaging, e.g. using scanning or transmission electron microscopy, permits individual particles to be imaged and sized directly. Image analysis techniques can be applied to electron micrographs to quantify size distributions and shape characteristics, such as the departure from sphericality. However, skilled interpretation may be needed to identify other crucial features, such as porosity, and to ascertain whether the object being visualized is a primary particle or an association of multiple primary particles, e.g. particles that have agglomerated or are joined more rigidly.

Radiation scattering techniques, including small-angle x-ray and neutron scattering and static or dynamic light scattering also can be used to determine ensemble averages and size distributions although broad or multimodal distributions and irregular shaped particles or distributions of shape complicate interpretation of the scattering data.

In one embodiment of a measuring technique, particle size may be measured by dynamic light scattering (DLS), which is typically carried out on particles prepared in a dilute suspension. A suitable instrument for the measurement is available commercially as a Microtrac Nanotrac Ultra particle size analyzer. The Nanotrac Ultra applies heterodyne detection using a 780 nm diode laser at an incident angle of 180 degrees.

In a typical data collection the background signal is first measured. A rigorously cleaned borosilicate glass vessel is filled with approximately 10 mL of the carrier fluid and equilibrated to room temperature. The Nanotrac optical probe is inserted and the background measured for 300 s using Microtrac Flex® software Set Zero function. The resulting loading index after background subtraction is nominally zero. The sample of interest is then loaded into the glass vessel until a suitable loading index is achieved within the concentration-independent loading regime. The sample temperature is equilibrated with the ambient environment prior to measurement. Each sample is run a sufficient number of times to obtain satisfactory data.

The autocorrelation function for each run is acquired from the instrument and interpreted by the software using low filtering and high sensitivity settings. Typically, each cumulative correlation function is fit using the method of cumulants to obtain the z-average diffusion coefficient and normalized second cumulant (polydispersity term). The z-average diffusion coefficient is then converted to an effective hydrodynamic diameter (or effective diameter) of the particles using the Stokes-Einstein expression and the known viscosity of water for the appropriate ambient temperature (e.g., 0.955 cP at 25° C.). The volume weighted distribution of the particles is derived in accordance with Mie Theory using the appropriate refractive index (e.g., 1.7 for alumina particles and 1.33 for the suspending aqueous solution). The volume distributions from all the runs are averaged to obtain final DLS results.

In another embodiment of a measuring technique, particle size may be measured by a static light scattering (SLS) method, which is likewise typically carried out on particles prepared in a dilute suspension in liquid. A suitable instrument for this measurement is available commercially as a Beckman Coulter LS 13 320 Particle Size Analyzer. This instrument operates at multiple wavelengths, combining 780 nm laser diffraction with Polarized Intensity Differential Scattering (PIDS) at 450 nm, 600 nm and 900 nm. The Mie Theory for light scattering is applied through software to calculate the particle size distributions using an assumed complex refractive index of 1.7; 0.01i.

Various statistical characterizations can be derived from particle distribution data obtained using either dynamic or static light scattering. The $d_{50}$ or median particle size by volume is commonly used to represent the approximate particle size. Other common statistically derived measures of particle size include $d_{10}$ and $d_{90}$. It is to be understood that 10 vol. % and 90 vol. % of the particles in the ensemble have a size less than $d_{10}$ and $d_{90}$, respectively. These values, taken either singly or in combination with the $d_{50}$ values, can provide additional characterization of a particle distribution, which is especially useful for a distribution that is not symmetrical, or is multimodal, or complex.

It is to be noted that in some instances, particle size distributions obtained with different techniques show subtle differences. These differences are generally more pronounced for ensembles in which the particles are non-spherical, irregularly shaped, multi-modal, or not fully dense. For example, dynamic light scattering measurements of submicron particle ensembles typically are insensitive to the presence of particles above 1 μm, such as particles resulting from the aggregation or agglomeration of smaller primary particles, which may be revealed in micrographs or in static light scattering. Particles in such ensembles are nevertheless regarded as submicron particles useful in the practice of the present disclosure, provided that their $d_{50}$ values are less than 500 nm, as discussed hereinabove.

In an embodiment, the particles of filler materials useful in the practice of the present disclosure may have a median particle size by volume ($d_{50}$) determined by dynamic light scattering of about 500 nm or less, 220 nm or less, 120 nm or less, or 70 nm or less. In some embodiments, the $d_{50}$ value determined by dynamic light scattering may be at least about 50 nm, at least about 70 nm, or at least about 100 nm.

Further embodiments may have a filler particle size distribution wherein the $d_{50}$ value is in the range from about 50 to 500 nm, or about 70 to 500 nm, or about 100 to 220 nm. The primary particle size of the particles of the filler material in some embodiments may be about 10-30 nm, about 30-50 nm, or about 30-60 nm.

Although particulate filler materials having average particle sizes below about 100 nm can be prepared by processes that entail use of grinding, crushing, milling, or other mechanical processes to make small particles from larger precursors, chemical synthesis, gas-phase synthesis, condensed phase synthesis, high speed deposition by ionized cluster beams, consolidation, deposition and sol-gel methods may also be used, and may be easier to use, for such purpose.

In another embodiment, the particles of filler materials useful in the practice of the present disclosure may have a median particle size by volume ($d_{50}$) determined by static light scattering of about 1500 nm or less, 500 nm or less, or 200 nm or less. In some embodiments, the $d_{50}$ value determined by static light scattering may be at least about 80 nm, at least about 100 nm, or at least about 200 nm.

In still other embodiments, the particles of filler materials useful in the practice of the present disclosure exhibit a size distribution characterized by a $d_{90}$ value measured by dynamic light scattering of about 1000 nm or less, 500 nm or less, 330 nm or less.

In yet other embodiments, the particles of filler materials useful in the practice of the present disclosure exhibit a size distribution characterized by a combination of more than one of the foregoing measures, e.g., by at least two of $d_{50}$ measured by dynamic light scattering, $d_{50}$ measured by static light scattering, $d_{90}$ measured by dynamic light scattering, $d_{90}$ measured by static light scattering, and an effective average size measured by the BET method. For example, in an embodiment, the particles exhibit a $d_{50}$ measured by dynamic light scattering of 220 nm or less and a $d_{90}$ measured by dynamic light scattering of 330 nm or less. In another embodiment, the particles exhibit a $d_{50}$ measured by dynamic light scattering of 220 nm or less and a $d_{50}$ measured by static light scattering of 340 nm or less. In still another embodiment, the particles exhibit a $d_{50}$ measured by dynamic light scattering of 220 nm or less and an effective average particle size of 80 nm as measured by the BET method. All such combinations of size requirements set forth above are understood to be within the scope of embodiments of the present disclosure.

Figure 2:
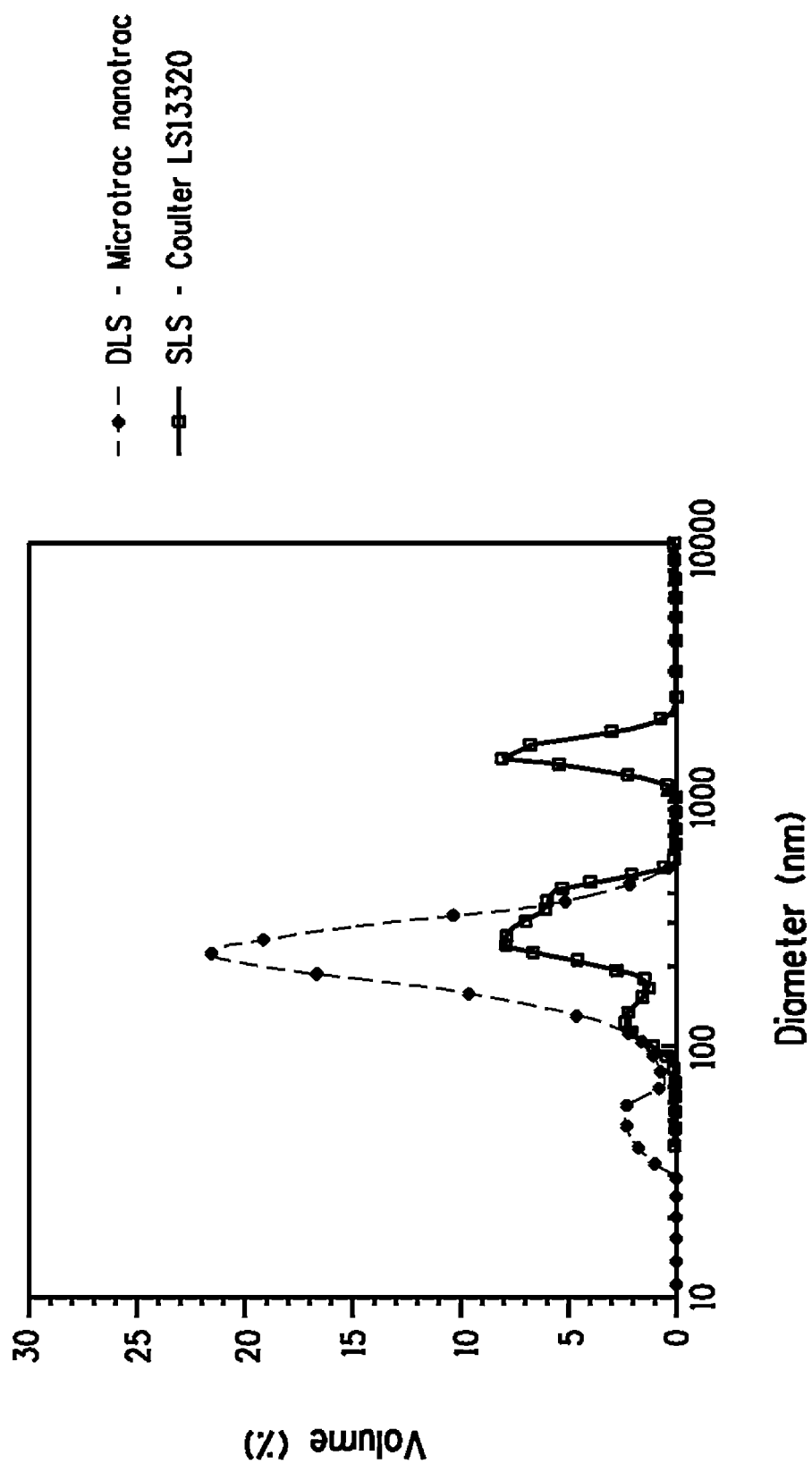
FIG. 2 depicts particle size distributions for a form of α-alumina useful as particulate filler material in the practice of the present disclosure.

An example of the complementary nature of the different ways to characterize particle size is provided by a submicron α-alumina (Stock #44652, Alfa Aesar, Ward Hill, Mass.) which has been found to be useful in the present composite. FIG. 2 provides particle size distribution data obtained for this material by both static and dynamic light scattering. Values of $d_{50}$, $d_{10}$, and $d_{90}$ (in nm) obtained from these distributions are set forth in Table I below. The same material is indicated by the manufacturer to have a particle size of 60 nm, although the test method is not identified. It may be seen that both DLS and SLS demonstrate a particle size larger than the 60 nm indicated by the manufacturer. The peak seen in the SLS distribution at about 2000 nm is believed to further indicate the presence of an appreciable number of substantially agglomerated or aggregated particles not separated during the sonication applied. DLS is insensitive to these large particles, and their contribution somewhat shifts the determination of $d_{50}$, $d_{10}$, and $d_{90}$ in the SLS data from the corresponding values derived from the DLS data. Nevertheless, this alumina material still may be considered submicron particles because the $d_{50}$, even as measured by static light scattering, is less than 500 nm.

TABLE I

Characterization of Particle Size Distribution of an α-alumina

|  | DLS | SLS |
| --- | --- | --- |
| $d_{50}$ | 219 nm | 335 nm |
| $d_{10}$ | 110 nm | 176 nm |
| $d_{90}$ | 330 nm | 1.52 μm |

Figure 3:
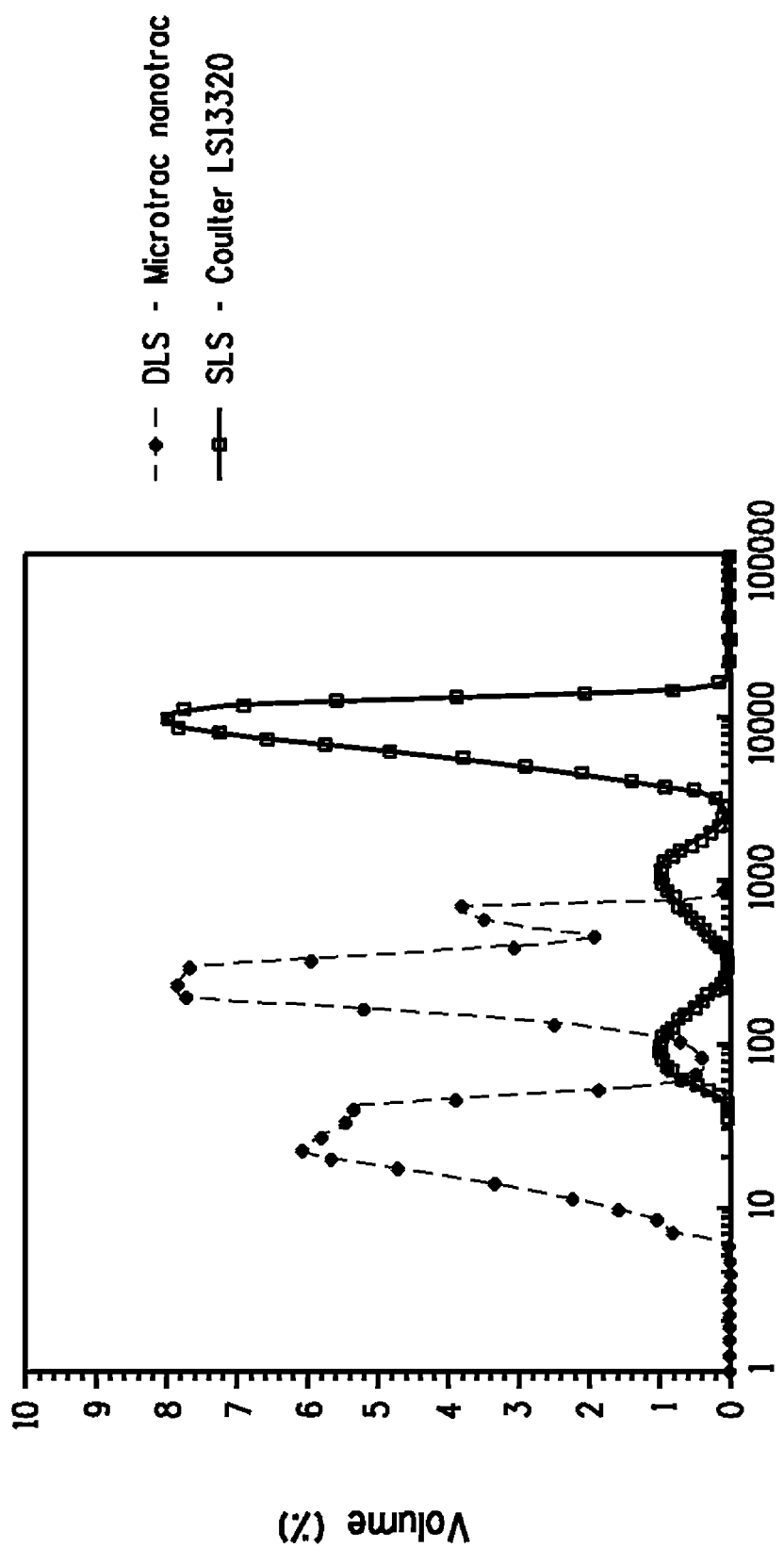
FIG. 3 depicts particle size distributions for a form of rutile TiO$_2$ useful as particulate filler material in the practice of the present disclosure.

A rutile-form of $TiO_2$ found useful as a submicron particulate filler yields SLS and DLS data shown in FIG. 3 and in Table II below.

TABLE II

Characterization of Particle Size Distribution of $TiO_2$

|  | DLS | SLS |
| --- | --- | --- |
| $d_{50}$ | 116 nm | 7.4 μm |
| $d_{10}$ | 18.4 nm | 214 nm |
| $d_{90}$ | 400 nm | 12.4 μm |

These data represent another example of the differences in the data provided by the SLS and DLS methods for particles useful in the practice of the present disclosure. The peak at around 10 μm in the SLS-determined distribution may indicate that at least some of the primary particles are substantially aggregated or agglomerated.

Various embodiments of the present composition and fluoropolymer composite body incorporate levels of particulate filler material loading that may range from about 0.1 wt. % to about 50 wt. %. In another embodiment, the final loading of particulate filler material in the fluoropolymer may be about 0.1 to 30 wt. %. In still other embodiments, the final loading may be about 0.1 to 20 wt. %, about 0.1 to 10 wt. %, about 0.5 to 10 wt. %, or about 1 to 8 wt. %. Too high a loading may compromise mechanical properties of the composite body, such as tensile strength and toughness. While a low loading may beneficially improve such strength properties, the loading may be chosen to produce concomitantly a sufficient improvement in wear properties over an unloaded fluoropolymer body. In general, the composite body may include a higher loading of submicron or nanoscale particles than larger particles without excessive degradation of the mechanical properties, provided the particles are well dispersed.

The foregoing composition of matter and fluoropolymer composite body may be prepared by any suitable process.

In an aspect, there is provided a possible process for manufacturing the present composition of matter using a slurry technique, which may be carried out using any of the particulate filler materials and fluoropolymer materials discussed herein. In an embodiment of the slurry process, the particulate filler material is first dispersed in a polar organic liquid. The particle dispersion is then mixed with fluoropolymer powder particles and the combination is processed to create a precursor slurry in which the particles of the filler material are substantially uniformly dispersed. The slurry is then dried, typically under a combination of vacuum and heating, to form a composite powder material, in which the particles are associated with the surface of the fluoropolymer powder particles. The composite powder preferably is free flowing. In some embodiments, the particles may be submicron or nanoscale particles. The slurry-based process has been found to promote better dispersion of particles in a composite powder than other techniques such as jet-milling typically provide, without having a deleterious effect on the fluoropolymer itself.

In an implementation of the slurry process, the particle dispersion is formed by combining the particulate filler material and the polar organic liquid in a suitable vessel and then imparting mechanical energy to the combination. In an embodiment, the mechanical energy is provided by sonication, meaning an exposure to a source of ultrasonic energy. Preferably, the intensity and time of the exposure is sufficient to cause the particulate filler material to become substantially fully dispersed in the polar organic liquid. Alternatively, the energy may be supplied by any other suitable high-energy mixing technique, including without limitation high vortex or high shear mixing. Ideally, the particle dispersion remains stable for a time sufficient for the formation of the dried composite powder material. Various effects, including particle shape, size, and composition, and the polar organic liquid used, alter the forces governing particle interactions, and thus the stability of the particle dispersion.

A precursor slurry is then formed by combining the particle dispersion and particles of a desired fluoropolymer. The term "particle," as used herein with reference to fluoropolymer compositions, refers to any divided form, including, without limitation, powder, fluff, granules, shavings, and pellets. The particles may have any characteristic dimensions consistent with adequate blending and dispersion of the particulate filler material in a final composite body produced using the composite powder material. In an embodiment, the fluoropolymer particles may have characteristic dimensions ranging from about 100 nm to several mm. It has been found that in some embodiments smaller fluoropolymer particles are beneficially employed to promote good dispersion of the particulate filler material. It is believed that improving the dispersion of the particulate filler material on the starting fluoropolymer powder typically results in a more uniform dispersion of the filler particles in the final composite body, which can lead in turn to better ultimate mechanical properties of the final body, including both its wear and friction performance and its strength.

A variety of polar organic liquids are useful in creating the particle dispersion and precursor slurry from which the present composite powder material and fluoropolymer composite body are produced. Suitable polar organic liquids include, but are not limited to, lower alcohols, such as methanol, ethanol, isopropanol (IPA), n-butanol, and text-butanol. Other polar organic liquids are useful as well, including N,N-dimethylacetamide (DMAc), esters, or ketones. In certain preferred embodiments, IPA is used.

The initial particle dispersion may be formed with any concentration of the particulate filler material in the polar organic liquid that is consistent with adequate dispersion. However, for the sake of minimizing the energy consumed in the process, the amount of particle substance in the polar organic liquid is preferably maximized, consistent with adequate dispersion. Such a composition route minimizes the amount of the polar organic liquid that must later be removed. In an implementation, the particle dispersion may contain particles in an amount up to about 10 wt. %, up to about 8 wt. %, up to about 5 wt. %, or up to about 2 wt. %, based on the total liquid dispersion. The removed liquid may be recycled, burned to recover its latent energy, or otherwise disposed.

The particle dispersion is then combined with an amount of fluoropolymer required to produce the desired loading of the particulate filler material in the dried composite powder material. Depending on the end use, particulate filler material is present in the dried composite powder material in an amount such that the final loading of the filler particles in the composite fluoropolymer body may range from about 0.1 wt. % to about 50 wt. %. In another embodiment, the final loading of filler material in the fluoropolymer may be about 0.1 to 30 wt. %. In still other embodiments, the final loading of the filler material may be about 0.1 to 20 wt. %, about 0.1 to 10 wt. %, about 0.5 to 10 wt. %, or about 1 to 8 wt. %. Too high a loading may compromise mechanical properties of the composite body, such as tensile strength and toughness. While a low loading may beneficially improve such strength properties, the loading may be chosen to produce concomitantly a sufficient improvement in wear properties over an unloaded fluoropolymer body. In general, the composite body may include a higher loading of submicron or nanoscale filler particles than larger filler particles without excessive degradation of the mechanical properties, provided the particles are well dispersed.

In a further aspect, the composite powder material produced as described above is used to form a fluoropolymer composite body. In one embodiment, in which the fluoropolymer is not melt processible, the composite powder material is compression molded and sintered to form the composite body. The sintering operation can be carried out under compression or as a free sintering, i.e., without continued application of a compressive force.

Alternative embodiments provide fluoropolymer composite bodies formed by melt processing the composite powder material. In some implementations, the melt processing comprises a multistage process, in which an intermediate is first produced in the form of powder, granules, pellets, or the like, and thereafter remelted and formed into an article of manufacture having a desired final shape. In an implementation, the intermediate is formed by a melt compounding or blending operation that comprises transformation of a thermoplastic resin from a solid pellet, granule or powder into a molten state by the application of thermal or mechanical energy. Requisite additive materials, such as composite powder material comprising fluoropolymers and particulate filler material associated therewith and prepared as described herein, may be introduced during the compounding or mixing process before, during, or after the polymer matrix has been melted or softened. The compounding equipment then provides mechanical energy that provides sufficient stress to disperse the ingredients in the compositions, move the polymer, and distribute the filler material to form a homogeneous mixture.

Melt blending can be accomplished with batch mixers (e.g. mixers available from Haake, Brabender, Banbury, DSM Research, and other manufacturers) or with continuous compounding systems, which may employ extruders or planetary gear mixers. Suitable continuous process equipment includes co-rotating twin screw extruders, counter-rotating twin screw extruders, multi-screw extruders, single screw extruders, co-kneaders (reciprocating single screw extruders), and other equipment designed to process viscous materials. Batch and continuous processing hardware suitably used in forming the present fluoropolymer composite body may impart sufficient thermal and mechanical energy to melt specific components in a blend and generate sufficient shear and/or elongational flows and stresses to break solid particles or liquid droplets and then distribute them uniformly in the major (matrix) polymer melt phase. Ideally, such systems are capable of processing viscous materials at high temperatures and pumping them efficiently to downstream forming and shaping equipment. It is desirable that the equipment also be capable of handling high pressures, abrasive wear and corrosive environments. Compounding systems used in the present method typically pump a formulation melt through a die and pelletizing system.

The intermediate may be formed into an article of manufacture having a desired shape using any applicable technique known in the art of melt-processing polymers.

In other implementations, material produced by the melt-blending or compounding step is immediately melt processed into a desired shape, without being cooled or formed into powder, granules, pellets, or the like. For example, the production may employ in-line compounding and injection molding systems that combine twin-screw extrusion technology in an injection molding machine so that the matrix polymer and other ingredients experience only one melt history. In other embodiments, materials produced by shaping operations, including melt processing and forming, compression molding or sintering, may be machined into final shapes or dimensions. In still other implementations, the surfaces of the parts may be finished by polishing or other operations.

It is also contemplated that the composite powder material be used as a carrier by which the particulate filler material is introduced into a matrix that may comprise either an additional amount of the same fluoropolymer used in the composite powder material, one or more other fluoropolymers, or both. For example, the composite powder material may be formed using the slurry technique with a first fluoropolymer powder material that is not melt-processable, with the intermediate thereafter blended with a second, melt-processible fluoropolymer powder. In an embodiment, the proportions of the two polymers are such that the overall blend is melt-processible. Other embodiments may entail more than two blended fluoropolymers. Alternatively, the intermediate is formed with a non-melt processible fluoropolymer and thereafter combined with more of the same fluoropolymer and processed by compression molding and sintering.

In still other implementations, the slurry technique is employed to disperse particulate filler material onto melt-processible fluoropolymer powder particles, which are either melt-processed directly to form a composite body or used as an intermediate that is let down in a melt processing operation with additional melt-processible fluoropolymer powder particles without the filler material. The additional fluoropolymer particles may be of the same or different type.

In another embodiment, melt compounding equipment, such as that described above, is used to prepare the composition of matter by directly combining the requisite amounts of the particulate filler material and melt-processible fluoropolymer, without prior use of the slurry technique to disperse the filler onto particles of the fluoropolymer. The blended composition is then processed into a fluoropolymer composite body using any of the techniques described above, including, but not limited to, injection molding and extrusion. For some compositions, the level of dispersion of the filler in the composite body thus produced is adequate to for the body to attain an acceptable level of the required tribological characteristics, including low friction and low wear. In still another aspect, composite powder material can be prepared using other forms of mixing, including jet milling, to disperse the particulate filler material onto the surface of fluoropolymer particles. Such mixing can be carried out with either melt-processible or non-melt processible fluoropolymer particles, The respective forms of the composite powder material can then be either melt processed or sintered, as described above.

It is further understood that the present fluoropolymer composite body can be prepared either as a discrete object or, alternatively, as a body associated with another object, such as a layer that is coated on, or otherwise attached to, at least one external surface of such an object. The term "fluoropolymer composite body" as used herein is thus to be understood as referring to any of these structures, all of which can provide a wear surface adapted to bear on a countersurface to provide a low wear-rate couple.

Forms of the present process may be used to prepare composite bodies that in some embodiments exhibit wear rates that may be at most $1 \times 10^{-6}$ mm$^3$/N-m, or at most $5 \times 10^{-7}$ mm$^3$/N-m, or at most $1 \times 10^{-8}$ mm$^3$/N-m, e.g., as measured using a reciprocating tribometer to move the composite against a lapped 304 stainless steel counterface at a pressure of 6.25 MPa and a velocity of 50.8 mm/s. In an embodiment, the present process may be used to prepare composite bodies that exhibit friction coefficients that may be less than about 0.3 or less than about 0.25.

In another aspect, there is provided a process for forming a transfer film on a bearing surface of one member of a bearing couple, the other member being an implement having a surface, at least part of which is provided by a fluoropolymer composite body. The process comprises contacting the surface of the fluoropolymer composite body with the bearing surface; applying a loading urging the surface of the composite body against the bearing surface; and moving the composite body against the bearing surface, the amount of motion and the loading being sufficient to cause a transfer film derived from the composite body to be formed on the bearing surface. In some embodiment, a steady-state form of the transfer film is attained after an initial run-in period. In some implementations, the substrate can be a transparent material, such as an oxide glass or hard polymer. Also provided is the substrate formed by the foregoing process.

EXAMPLES

The operation and effects of certain embodiments of the present disclosure may be more fully appreciated from a series of examples (Examples 1-14), as described below. The embodiments on which these examples are based are representative only, and the selection of those embodiments to illustrate aspects of the disclosure does not indicate that materials, components, reactants, conditions, techniques and/or configurations not described in the examples are not suitable for use herein, or that subject matter not described in the examples is excluded from the scope of the appended claims and equivalents thereof. The significance of the examples is better understood by comparing the results obtained therefrom with the results obtained from certain trial runs that are designed to serve as Control Examples 1-2, which provide a basis for such comparison since they are fluoropolymer based, but either do not contain particulate filler material or are processed by different methods.

Materials

Materials used in carrying out the examples include the following:

Isopropyl alcohol (IPA): Optima® grade (H$_2$O<0.020%, 0.2 μm filtered) stored over a 4 Å molecular sieve (Fisher Scientific, Pittsburgh, Pa.).

PTFE 7C powder: Teflon® PTFE 7C polytetrafluoroethylene granular resin (DuPont Corporation, Wilmington, Del.).

PFA 340: Teflon® PFA 340: perfluoroalkoxy resin (DuPont Corporation, Wilmington, Del.), which is loosely compacted fluff that has not been melt-processed.

Submicron α-alumina:
Sample A: Stock #44652, Alfa Aesar, Ward Hill, Mass., represented by the manufacturer as having an approximate particle size of 60 nm;
Sample B: Stock #44653, Alfa Aesar, Ward Hill, Mass., represented by the manufacturer as having an approximate particle size of 27-43 nm.
Sample C: Stock #42573, Alfa Aesar, Ward Hill, Mass., represented by the manufacturer as having an approximate particle size of 350-490 nm;
(No measurement method was indicated by the manufacturer for determining the average particle size.)

Rutile $TiO_2$: Prepared by a laboratory precipitation process, yielding a size distribution with a $d_{50}$ value of 160 nm as measured by dynamic light scattering.

Reciprocating Wear Resistance Testing

Tests of samples under reciprocating motion of a pin-like sample against a planar hard surface were performed using an automated, computer-controlled tribometer like that depicted in FIG. 2 of U.S. Pat. No. 7,790,658 to Sawyer et al. ("the '658 patent"), which patent is incorporated herein in the entirety by reference thereto. Additional description of such a tribometer is provided in an article by W. G. Sawyer et al., "A Study on the Friction and Wear of PTFE Filled with Alumina Nanoparticles," Wear, vol. 254, pp. 573-580 (2003). The tribometer permitted a fluoropolymer-based test sample to be placed in reciprocating, sliding contact with a counterface, with the normal loading force carefully controlled and the loading and sliding forces continuously monitored and logged. The wear was monitored both by a position transducer that measured the reduction in height of the test specimen and by periodically removing and weighing the test sample.

The tribometer was used to test samples having the form of an elongated prism with a square cross-section of about 6.4×6.4 mm. Typically the prism had an initial length of about 20 mm. In each case, conventional machining techniques were used to prepare samples in this form from the various starting composite bodies. Except as otherwise stated below, the counterface used in the present wear rate measurements was a 304 series stainless steel plate, lapped to produce a surface roughness characterized by a value of about R(rms)=161 nm, with a standard deviation of 35 nm. Measurements were carried out with the square face of the sample pressed against the counterface with a pressure of about 6.25 MPa and moved in reciprocating fashion with a velocity of about 50.8 mm/s. It is to be noted that observed wear rates are known to be dependent in part on the counterface material and specific loading and speed, so that the present fluoropolymer bodies would likely exhibit different wear rates if tested against different counterfaces, e.g., having different composition or surface finish.

Control Example 1

Processing of an Unloaded PTFE Sample.

Teflon® PTFE 7C powder was formed into a test sample using a compression molding and sintering technique consistent with the protocol of ASTM D4894-07. The mold used had a cavity in the shape of a right circular cylinder with a diameter of about 2.86 cm. The mold was charged with about 12 g of the starting powder material. The powder was compressed with a loading of about 5000 psi and held at ambient temperature for 2 minutes to form a compact about 0.9 cm high.

The compressed-powder compact was then removed from the mold and free-sintered to form the test sample. First, the compact was placed into a 290° C. oven with a nitrogen purge. The oven temperature was immediately ramped up to 380° C. at a rate of 120° C./h and then held at 380° C. for 30 minutes. Thereafter, the specimen was cooled to 294° C. at a rate of 60° C./h and held at 294° C. for 24 minutes before removing it from the oven.

A sample suitable for wear testing was obtained from the sintered body by conventional machining techniques.

Example 1

Preparation of an Alumina-PTFE Composite Body Using Jet Milling.

A sintered α-alumina/PTFE composite body was prepared generally in accordance with the procedures set forth in U.S. Pat. No. 7,790,658, which is incorporated herein in the entirety by reference thereto. In particular, a mixture of 5 wt. % Sample A α-alumina in Teflon® PTFE 7C was prepared, and passed three times through an alumina-lined Sturtevant jet mill. This powder was added to a 12.6 mm diameter vessel and consolidated in a press at 500 MPa uniaxial pressure. The resulting compressed pellet was then sintered while under 2.5 MPa of pressure with the following temperature profile: ramp to 380° C. over 3 hours, hold at 380° C. for 3 hours, ramp to ambient temperature over 3 hours. A sample suitable for wear testing was obtained from the sintered body by conventional machining techniques.

Example 2

Preparation of an Alumina-PTFE Composite Body Using a Slurry Process.

A precursor slurry containing approximately 3.45 wt. % of the same submicron particle Sample A α-alumina as used in Example 1 was formed by adding 5.0 g of the particles to 140 g of IPA in a 200 mL bottle. After adding the submicron particles, the bottle was sonicated using an ultrasonic horn (Branson Digital Sonicator 450 with a titanium tip, operating at about 40% amplitude (400 W)). The mixture was subjected to 3 cycles of 1 min duration, with a 45 sec relaxation interval after each cycle. The result was a milky dispersion with no visible particles.

Quickly thereafter, 91.6 g of this slurry (to provide 3.16 g of alumina) was added to a 500 mL pear-bottom flask containing 60.0 g of the same Teflon® PTFE 7C granular powder used to prepare the samples of Example 1. The amount of slurry was selected to provide an alumina level of 5.0 wt. % in the final PTFE/alumina mixture. The flask wall was rinsed with an additional 100 mL of IPA to clear the flask wall. The flask was then gently swirled for a few minutes to assure mixing of the PTFE powder and the IPA/alumina slurry.

Then the PTFE powder-IPA/alumina slurry mixture was dried in the flask using a rotary evaporator. Pressure was slowly reduced and the water bath heated to 55° C. to evenly evaporate and remove the polar organic liquid, while carefully avoiding bumping. The slurry continued to mix as the polar organic liquid was removed. The resulting powder was further dried for four hours at 50° C. under high vacuum (4 Pa≅30 milliTorr) for 4 hours to remove any residual water and/or IPA. The dried composite powder material was free flowing. The dried composite powder material was then formed into test samples by the same compression molding and sintering technique set forth in Control Example 1.

Example 3

Wear Rate of an α-Alumina/PTFE Composite Bodies.

The reciprocating wear rate of samples of a sintered α-alumina/PTFE composite bodies prepared as set forth in Examples 1 and 2 were tested and compared with that of a sample prepared as set forth in Control Example 1.

The results show that the IPA slurry-prepared α-alumina/PTFE composite body of Example 2 exhibits a low reciprocating wear rate of $k=7.04 \times 10^{-8}$ mm$^3$/N-m, which is markedly better than the relatively poor wear rate $k=3.74 \times 10^{-4}$ mm$^3$/N-m of the unloaded PTFE material of Control Example 1. The jet-milled α-alumina/PTFE composite body of Example 1 also showed a low wear rate of $k=1.3 \times 10^{-7}$ mm$^3$/N-m.

Both the jet-milled and slurry-based α-alumina/PTFE composite bodies exhibited low friction characteristics, e.g. coefficients of sliding friction of about 0.2-0.23, versus 0.18 for unloaded PTFE, when measured under the conditions against lapped 304 stainless steel.

Examples 4-5

Preparation of a PFA-Submicron Particle Composite Bodies Using Melt Blending.

A laboratory-scale melt-processing technique was used to prepare composite bodies of Teflon® PFA 340 loaded with 5 wt. % submicron α-alumina particles of Samples A and B for tribology and mechanical testing as set forth in Table I.

TABLE I

PFA-Submicron α-alumina Composite Body Samples

| Example | PFA Type | Alumina Lot |
| --- | --- | --- |
| 4 | Teflon ® PFA 340 | Sample A |
| 5 | Teflon ® PFA 340 | Sample C |

The samples were prepared by directly melt blending the submicron α-alumina particles and Teflon® PFA 340 matrix material. The melt blending was carried out using an Xplore™ microcompounding system (DSM Research, Galeen, Nev.), which employed a 15 cc capacity, co-rotating, intermeshing, conical twin-screw batch mixer with a recirculation loop and sample extraction valve. Requisite amounts of the selected submicron α-alumina and the Teflon® PFA 340 for each sample were hand mixed and slowly loaded into the mixer through a funnel and plunger system mounted on the top of the barrel with the screws turning. When loading was complete, the feed plunger was removed and replaced with a plug. The mixing time was marked when the plug had been secured.

The microcompounder was configured with three barrel heating zones (top-center-bottom) appointed for control and operation at up to 400° C. Temperatures were monitored with a melt thermocouple located below the screw tips. The drive motor amperage and force on the barrels imparted by the screw pumping were monitored to indicate changes in viscosity due to the composition, temperature, chemical reactions or the state of the dispersion. Average values for temperature, force and amperage were recorded. Extrudate from the mixer was collected in a heated transfer cylinder with a movable plunger and placed into an injection molding unit.

An air-driven injection molding machine having a heated and water-cooled cylinder containing a removable two-piece mold was used for melt processing the finished composite bodies. The operation of the molding machine was controlled to permit preselection of injection parameters, including injection pressure and time, and pack hold pressure and time.

Each sample in turn was mixed and placed in the transfer cylinder as described above, and then loaded and secured in the molding machine. The air driven cylinder was activated, pushing the plunger to force the molten material into the mold cavity. After completion of the injection molding cycle, the mold was removed from the heated cavity and the halves separated, so the molded part could be removed from the mold and allowed to cool to ambient temperature.

Samples suitable for wear testing were obtained from the injection-molded body by conventional machining techniques.

Example 6

Preparation of a Teflon® PFA 340-Submicron Particle Composite Body Using a Slurry Technique.

Another Teflon® PFA 340-submicron α-alumina particle composite body was prepared by melt processing a composite powder material prepared using a slurry process. In particular, a precursor slurry containing approximately 3.45 wt. % of submicron α-alumina particulate filler material was formed by adding 5.0 g of the Sample A particles to 140 g of IPA in a 200 mL bottle. After adding the submicron particles, the bottle was sonicated using an ultrasonic horn (Branson Digital Sonicator 450 with a titanium tip, operating at about 40% amplitude (400 W)). The mixture was subjected to 3 cycles of 1 min duration, with a 45 sec relaxation interval after each cycle. The result was a milky dispersion with no visible particles.

Quickly thereafter, 91.6 g of this slurry (to provide 3.16 g of alumina) was added to a 500 mL pear-bottom flask containing 60.0 g of Teflon® PFA 340 fluff. The amount of slurry was selected to provide an alumina level of 5.0 wt. % in the final PFA/alumina mixture. The flask wall was rinsed with an additional 100 mL of IPA to clear the flask wall. The flask was then gently swirled for a few minutes to assure mixing of the PFA material and the IPA/alumina slurry.

Then the PFA powder-IPA/alumina slurry mixture was dried in the flask using a rotary evaporator with a water bath for heating. Pressure was slowly reduced and the bath heated to 55° C. to evenly evaporate and remove the polar organic liquid, while carefully avoiding bumping. The slurry continued to mix as the polar organic liquid was removed. The resulting powder was further dried for four hours at 50° C. under high vacuum (4 Pa≅30 milliTorr) for 4 hours to remove any residual water and/or IPA. The dried composite powder material was free flowing.

The composite powder material was then processed using the same mixing and injection molding apparatus set that was employed to make the melt-blended sample of Examples 4-5. The same processing conditions were used, resulting in an injection-molded sample visually similar to that of Examples 4-5.

A sample suitable for wear testing was again obtained from the injection-molded body by conventional machining techniques.

Control Example 2

Processing of an Unloaded Teflon® PFA 340 Sample

The same laboratory-scale melt-processing and injection-molding equipment and processing conditions used to prepare the samples of Examples 4-6 was used to prepare an injection-molded sample of Teflon® PFA 340 without particle addition for comparative tribology and mechanical testing.

Example 7

Wear Rate of α-Alumina/PFA Composite Bodies.

The reciprocating wear rate of samples of melt-processed α-alumina/PFA composite bodies prepared as set forth in Examples 4 to 6 were tested using the tribometer system described above and compared with wear rate data for the unloaded PFA bodies of Control Example 2.

The following results were obtained for the steady-state wear rate k and coefficient of sliding friction µ of these samples.

TABLE II

Friction and Reciprocating Wear Data for PFA Samples

| Example | k (mm$^3$/N-m) | µ |
|---|---|---|
| Control 2 | $3.77 \times 10^{-4}$ | 0.28 |
| 4 | $8.88 \times 10^{-8}$ | 0.25 |
| 5 | $2.40 \times 10^{-5}$ | 0.26 |
| 6 | $1.28 \times 10^{-7}$ | 0.26 |

The results show that composite bodies comprising melt-processible PFA matrices and alumina particulate filler materials may exhibit wear rates reduced by as much as three orders of magnitude from the wear rates of comparable unloaded Teflon® PFA 340 material, without compromise of a low coefficient of friction.

Examples 8-10

Preparation and Wear Testing of Alumina-PTFE Composite Bodies Using a Slurry Process.

Additional examples (Examples 8 and 9) of composite bodies comprising Sample A submicron α-alumina in Teflon® PTFE 7C were prepared using the same slurry process used for the samples of Example 2, but with the amount of alumina added adjusted to provide loading levels of 2 and 8 wt. %. Another sample (Example 10) was prepared using 5 wt. % of Sample B submicron α-alumina.

Reciprocating wear testing of these samples produced the results shown in Table III.

TABLE III

Friction and Wear Data for PTFE Samples

| Example | Alumina (wt. %) | k (mm$^3$/N-m) | µ |
|---|---|---|---|
| 8 | 2 | $1.07 \times 10^{-7}$ | 0.20 |
| 9 | 8 | $4.90 \times 10^{-8}$ | 0.23 |
| 10 | 5 | $2.09 \times 10^{-7}$ | 0.18 |

Low wear rates and low coefficients of friction were seen for these samples.

Examples 11-13

Wear Testing of Alumina-PTFE Composite Bodies Against Different Counterfaces.

Additional samples of composite bodies comprising 5 wt. % Sample A alumina in PTFE were prepared in accordance with the materials and process of Example 2 and tested for reciprocating wear rate as set forth in Example 3, except that the lapped 304 stainless steel counterface was replaced by other counterfaces, including a polished 304 stainless steel, a lapped Ti alloy (Ti6Al4V), and a glass microscope slide. Results of the wear testing are set forth in Table IV.

TABLE IV

Friction and Wear Data for PTFE Samples

| Example | Counterface | k (mm$^3$/N-m) | µ |
|---|---|---|---|
| 11 | polished stainless steel | $5.97 \times 10^{-8}$ | 0.24 |
| 12 | lapped Ti alloy | $5.69 \times 10^{-8}$ | 0.22 |
| 13 | glass | $3.93 \times 10^{-9}$ | 0.28 |

Low wear rates and low coefficients of friction were seen for these samples.

Example 14

Preparation and Wear Testing of a TiO$_2$-PTFE Composite Body

A composite body comprising 5 wt. % of a rutile form of TiO$_2$ in Teflon® PTFE 7C was prepared using the slurry process set forth in Example 2, but with the TiO$_2$ being substituted for α-alumina. Reciprocating wear testing carried out in accordance with Example 3 yielded a low wear rate of k=$1.11 \times 10^{-7}$ mm$^3$/N-m and a low coefficient of friction of µ=0.23.

Having thus described the disclosure in rather full detail, it will be understood that such detail need not be strictly adhered to, but that additional changes and modifications may suggest themselves to one skilled in the art. For example, additional additives known for use in fluoropolymers to aid in processing or to enhance properties may be added at various stages of producing the present composite body. It is to be understood that the present manufacturing process may be implemented in various ways, using different equipment and carrying out the steps described herein in different orders. All of these changes and modifications are to be understood as falling within the scope of the disclosure as defined by the subjoined claims.

In addition to vendors named elsewhere herein, various materials suitable for use herein may be made by processes known in the art, and/or are available commercially from suppliers such as Alfa Aesar (Ward Hill, Mass.), City Chemical (West Haven, Conn.), Fisher Scientific (Fairlawn, N.J.), Nanostructured & Amorphous Materials, Inc. (Houston, Tex.), PACE Technologies (Tucson, Ariz.), Sigma-Aldrich (St. Louis, Mo.), or Stanford Materials (Aliso Viejo, Calif.).

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the disclosure as described herein. Where a range of numerical values is stated herein as being less than a stated value, the range is nevertheless bounded on its lower end by a non-zero value. In addition, unless explicitly stated otherwise or indicated to the contrary by the context of usage, amounts, sizes, ranges, formulations, parameters, and other quantities and characteristics recited herein, particularly when modified by the term "about", may but need not be exact, and may also be approximate and/or larger or smaller (as desired) than stated, reflecting tolerances, conversion factors, rounding off, measurement error and the like, as well as the inclusion within a stated value of those values outside it that have, within the context of this disclosure, functional and/or operable equivalence to the stated value.

Each of the formulae shown herein describes each and all of the separate, individual compounds or monomers that can be assembled in that formula by (1) selection from within the prescribed range for one of the variable radicals, substituents or numerical coefficents while all of the other variable radicals, substituents or numerical coefficents are held constant, and (2) performing in turn the same selection from within the prescribed range for each of the other variable radicals, substituents or numerical coefficents with the others being held constant. In addition to a selection made within the prescribed range for any of the variable radicals, substituents or numerical coefficents of only one of the members of the group described by the range, a plurality of compounds or monomers may be described by selecting more than one but less than all of the members of the whole group of radicals, substituents or numerical coefficents. When the selection made within the prescribed range for any of the variable radicals, substituents or numerical coefficents is a subgroup containing (i) only one of the members of the whole group described by the range, or (ii) more than one but less than all of the members of the whole group, the selected member(s) are selected by omitting those member(s) of the whole group that are not selected to form the subgroup. The compound, monomer, or plurality of compounds or monomers, may in such event be characterized by a definition of one or more of the variable radicals, substituents or numerical coefficents that refers to the whole group of the prescribed range for that variable but where the member(s) omitted to form the subgroup are absent from the whole group.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

Infrared Analysis of Transfer and Running Films

Analysis of the transfer film and running films was done by attenuated total reflectance infrared (ATR-IR) analysis to provide qualitative results of functionality present in the transfer and running films. The IR results from comparing the transfer films of unfilled PTFE 7C and PTFE 7C with 5.0 wt. % Al2O3 (FIG. 1) show several broad new peaks in the alumina-containing sample at 3338, 1660, and 1425 cm-1 which are consistent with the O—H, C=O/C—O vibrations (respectively) of the salt of a fluorinated carboxylic acid. The assignment of these peaks as salts of perfluorocarboxylic acids was based on similar metal salts described in both Szlyk et al. 2 and Kajdas et al. 3 These peaks are quite different than the sharp narrow carbonyl peaks normally observed in perfluoropolymer for endgroups such as COOH (monomeric, ν=1813 cm-1), COOH (dimeric, ν=1777 cm-1), and COF (ν=1884 cm-1).

What is claimed is:

1. An article having a surface, wherein the surface comprises a film layer, wherein the film layer comprises a composition of a fluoropolymer in admixture with a particulate filler material, wherein the fluoropolymer comprises carboxylic acid and/or carboxylate functionality, and wherein the particulate filler material, prior to combination with the fluoropolymer, are aggregated or agglomerated particles from about 2 μm to 10 μm, and have a BET determined surface area of about 22 $m^2/g$ or more, wherein an amount of particulate filler material present is about 0.1 to 30 wt. % of the composition.

2. The article according to claim 1, wherein the fluoropolymer comprises PTFE.

3. The article according to claim 1, wherein the fluoropolymer comprises a blend of PTFE and PTFE micropowder.

4. The article according to claim 1, wherein the fluoropolymer comprises a thermoplastic, melt-processible and/or melt-fabricable fluoropolymer.

5. The article according to claim 1, wherein the fluoropolymer comprises a copolymer of TFE and one or both of a fluorinated olefin other than TFE and a fluorinated unsaturated ether.

6. The article according to claim 1, wherein the fluoropolymer comprises a blend of an elastomeric fluoropolymer and a PTFE micropowder.

7. An article having a surface, wherein the surface comprises a film layer, wherein the film layer comprises a composition of a fluoropolymer in admixture with a particulate filler material, wherein the fluoropolymer comprises carboxylic acid and/or carboxylate functionality, and wherein the particulate filler material, prior to combination with the fluoropolymer, are aggregated or agglomerated particles from about 2 μm to 10 μm, and have a BET determined surface area of about 22 $m^2/g$ or more, wherein the particulate filler material comprises aluminum oxide.

8. An article having a surface, wherein the surface comprises a film layer, wherein the film layer comprises a composition of a fluoropolymer in admixture with a particulate filler material, wherein the fluoropolymer comprises carboxylic acid and/or carboxylate functionality, and wherein the particulate filler material, prior to combination with the fluoropolymer, are aggregated or agglomerated particles from about 2 μm to 10 μm, and have a BET determined surface area of about 22 $m^2/g$ or more, wherein the particulate filler material comprises a mixture of aluminum oxide and silicon dioxide.

9. An article having a surface, wherein the surface comprises a film layer, wherein the film layer comprises a composition of a fluoropolymer in admixture with a particulate filler material, wherein the fluoropolymer comprises carboxylic acid and/or carboxylate functionality, and wherein the particulate filler material, prior to combination with the fluoropolymer, are aggregated or agglomerated particles from about 2 μm to 10 μm, and have a BET determined surface area of about 22 m²/g or more, wherein the particulate filler material comprises rutile titanium dioxide.

10. The article of claim 1, wherein the film layer is chemically and physically bonded to the surface, and wherein the surface is a metallic surface.

11. The article according to claim 7, wherein the fluoropolymer comprises PTFE.

12. The article according to claim 7, wherein the fluoropolymer comprises a blend of PTFE and PTFE micropowder.

13. The article according to claim 7, wherein the fluoropolymer comprises a thermoplastic, melt-processible and/or melt-fabricable fluoropolymer.

14. The article according to claim 7, wherein the fluoropolymer comprises a copolymer of TFE and one or both of a fluorinated olefin other than TFE and a fluorinated unsaturated ether.

15. The article according to claim 7, wherein the fluoropolymer comprises a blend of an elastomeric fluoropolymer and a PTFE micropowder.

16. The article according to claim 7, wherein an amount of particulate filler material present is about 0.1 to 30 wt. % of the composition.

17. The article according to claim 7, wherein the film layer is chemically and physically bonded to the surface, and wherein the surface is a metallic surface.

18. The article according to claim 8, wherein the fluoropolymer comprises PTFE.

19. The article according to claim 8, wherein the fluoropolymer comprises a blend of PTFE and PTFE micropowder.

20. The article according to claim 8, wherein the fluoropolymer comprises a thermoplastic, melt-processible and/or melt-fabricable fluoropolymer.

21. The article according to claim 8, wherein the fluoropolymer comprises a copolymer of TFE and one or both of a fluorinated olefin other than TFE and a fluorinated unsaturated ether.

22. The article according to claim 8, wherein the fluoropolymer comprises a blend of an elastomeric fluoropolymer and a PTFE micropowder.

23. The article according to claim 8, wherein an amount of particulate filler material present is about 0.1 to 30 wt. % of the composition.

24. The article according to claim 8, wherein the film layer is chemically and physically bonded to the surface, and wherein the surface is a metallic surface.

25. The article according to claim 9, wherein the fluoropolymer comprises PTFE.

26. The article according to claim 9, wherein the fluoropolymer comprises a blend of PTFE and PTFE micropowder.

27. The article according to claim 9, wherein the fluoropolymer comprises a thermoplastic, melt-processible and/or melt-fabricable fluoropolymer.

28. The article according to claim 9, wherein the fluoropolymer comprises a copolymer of TFE and one or both of a fluorinated olefin other than TFE and a fluorinated unsaturated ether.

29. The article according to claim 9, wherein the fluoropolymer comprises a blend of an elastomeric fluoropolymer and a PTFE micropowder.

30. The article according to claim 9, wherein an amount of particulate filler material present is about 0.1 to 30 wt. % of the composition.

31. The article according to claim 9, wherein the film layer is chemically and physically bonded to the surface, and wherein the surface is a metallic surface.

* * * * *